US012798723B2

(12) United States Patent
Gustafson et al.

(10) Patent No.: US 12,798,723 B2
(45) Date of Patent: Nov. 17, 2026

(54) SNOW VEHICLE

(71) Applicant: Polaris Industries Inc., Medina, MN (US)

(72) Inventors: Nicholas E. Gustafson, Roseau, MN (US); Konrad A. Swiatkowski, Lindstrom, MN (US)

(73) Assignee: POLARIS INDUSTRIES INC., Medina, MN (US)

(*) Notice: Subject to any disclaimer, the term of this patent is extended or adjusted under 35 U.S.C. 154(b) by 712 days.

(21) Appl. No.: 18/203,347

(22) Filed: May 30, 2023

(65) Prior Publication Data

US 2023/0382493 A1 Nov. 30, 2023

Related U.S. Application Data

(60) Provisional application No. 63/347,286, filed on May 31, 2022.

(51) Int. Cl.
*B62M 27/02* (2006.01)

(52) U.S. Cl.
CPC ....... *B62M 27/02* (2013.01); *B62M 2027/023* (2013.01); *B62M 2027/027* (2013.01); *B62M 2027/028* (2013.01)

(58) Field of Classification Search
CPC ............ B62M 27/02; B62M 2027/027; B62M 2027/028
See application file for complete search history.

(56) References Cited

U.S. PATENT DOCUMENTS

| | | | | |
|---|---|---|---|---|
| 3,318,407 | A * | 5/1967 | Deardorff | B62M 27/02 305/153 |
| 3,771,616 | A | 11/1973 | Parodi | |
| 3,822,755 | A | 7/1974 | Hine | |
| 3,887,023 | A * | 6/1975 | Henning | B62M 27/02 180/9.54 |
| 4,699,229 | A * | 10/1987 | Hirose | B62K 5/01 180/9.58 |
| 6,095,275 | A * | 8/2000 | Shaw | B62M 27/02 180/185 |
| 6,926,108 | B1 | 8/2005 | Polakowski | |
| 7,128,180 | B2 | 10/2006 | Polakowski | |
| 7,673,711 | B1 * | 3/2010 | Berg | B62K 5/01 180/9.21 |

(Continued)

FOREIGN PATENT DOCUMENTS

JP 2007182137 7/2007

*Primary Examiner* — Christopher B Wehrly
(74) *Attorney, Agent, or Firm* — Merchant & Gould P.C.

(57) ABSTRACT

A snow vehicle has a plurality of ground engaging members including a pair of track assemblies positioned within a pair of tunnel assemblies. The tunnel assemblies are coupled by a brace assembly extending across the tunnel assemblies. A powertrain is provided which provides power to at least one of the ground engaging members, the powertrain including a multipiece drive axle coupled to at least one of the ground engaging members. The powertrain also includes a fuel tank supported between the track assemblies, the fuel tank configured to provide fuel to the powertrain. The powertrain also includes a cooling assembly including a pair of coolers, each cooler positioned within one of the pair of tunnel assemblies.

7 Claims, 16 Drawing Sheets

(56) References Cited

U.S. PATENT DOCUMENTS

| | | | | |
|---|---|---|---|---|
| 7,753,154 | B2 * | 7/2010 | Maltais | B62M 27/02 180/190 |
| 8,499,876 | B2 | 8/2013 | Mercier | |
| 8,844,665 | B2 | 9/2014 | Wenger | |
| 2004/0080188 | A1 * | 4/2004 | Igarashi | B62D 25/06 296/203.04 |
| 2012/0205902 | A1 * | 8/2012 | Beavis | B62M 27/02 280/781 |
| 2013/0048392 | A1 | 2/2013 | Arcouette | |
| 2015/0210355 | A1 * | 7/2015 | Labbe | B60R 9/06 224/408 |
| 2015/0343900 | A1 * | 12/2015 | Schlangen | B62D 25/084 180/247 |
| 2015/0375826 | A1 * | 12/2015 | Sampson | B60K 11/04 180/190 |
| 2017/0029035 | A1 * | 2/2017 | Dube | B60R 7/043 |
| 2022/0024541 | A1 * | 1/2022 | Korsumaki | B62M 27/02 |

* cited by examiner

SNOW VEHICLE

The present application claims priority to U.S. Provisional Application Ser. No. 63/347,286, filed May 31, 2022, titled SNOW VEHICLE, the entire disclosure of which is expressly incorporated by reference herein.

FIELD OF THE DISCLOSURE

The present application relates to a snow vehicle, and more particularly, the frame assembly and powertrain assembly of a snow vehicle with two track assemblies.

BACKGROUND OF THE DISCLOSURE

Snow vehicles, also referred to as snowmobiles or snow machines, are used for powered transport across snow-covered roads and trails.

SUMMARY OF THE DISCLOSURE

The vehicle of the present disclosure relates to a snow vehicle with a plurality of ground engaging members including a pair of track assemblies positioned within a pair of tunnel assemblies. The tunnel assemblies are coupled by a brace assembly extending across the tunnel assemblies. A powertrain is provided which provides power to at least one of the ground engaging members, the powertrain including a multipiece drive axle coupled to at least one of the ground engaging members. The powertrain also includes a fuel tank supported between the track assemblies, the fuel tank configured to provide fuel to the powertrain. The powertrain also includes a cooling assembly including a pair of coolers, each cooler positioned within one of the pair of tunnel assemblies.

In an embodiment of the present disclosure, a snowmobile is provided. The snowmobile comprising a frame including a tunnel assembly, and a plurality of ground engaging members supporting the frame. The plurality of ground engaging members include a first ski and a first track. A powertrain is supported by the frame, the powertrain configured to provide rotational power to the first track. The tunnel assembly comprises a first tunnel portion comprising a pair of laterally-spaced longitudinally-extending panels including a first longitudinally extending panel and a second longitudinally extending panel. The tunnel assembly also comprises a second tunnel portion positioned on one lateral side of the first tunnel portion, the second tunnel portion comprising a first outer side panel laterally spaced outwardly from the first longitudinally extending panel of the first tunnel portion. The tunnel assembly also comprises a third tunnel portion positioned on the other lateral side of the first tunnel portion, the third tunnel portion comprising a second outer side panel laterally spaced outwardly from the second longitudinally extending panel of the first tunnel portion. The tunnel assembly also comprising a brace assembly, comprising a first brace positioned within the first tunnel portion, the first brace extending between the first longitudinally extending panel and the second longitudinally extending panel. The brace assembly also comprising a second brace positioned within the second tunnel portion, the second brace extending between the first outer side panel and the first longitudinally extending panel. The brace assembly also comprising a third brace positioned within the third tunnel portion, the third brace extending between the second outer side panel and the second longitudinally extending panel. The first brace is coupled to the second brace at a first coupling point and the first brace is coupled to the third brace at a second coupling point.

In yet another embodiment of the present disclosure, a snowmobile is provided. The snowmobile comprising a plurality of ground engaging members and a frame supported by the plurality of ground engaging members. The frame comprises a tunnel assembly. The snowmobiles also comprises a powertrain supported by the frame, the powertrain including a prime mover operably coupled to a transmission. The powertrain also comprises a jackshaft operably coupled to the transmission, the jackshaft rotatable about a jackshaft axis and a drive axle operably coupled to the jackshaft. The drive axle is rotatable about a drive axle axis and configured to provide rotational power to at least one of the plurality of ground engaging members, and the jackshaft axis and the drive axle axis are nominally parallel. The tunnel assembly comprises a first tunnel including a first longitudinally extending panel, the first longitudinally extending panel including a first opening and a second opening. The first opening is positioned at a forward portion of the first longitudinally extending panel, the first opening defining a central axis nominally coaxial to the jackshaft axis and configured to receive a portion of the jackshaft. The second opening is spaced longitudinally from the first opening, the second opening defining a central axis nominally coaxial to the drive axle axis and configured to receive a portion of the drive axle.

In yet another embodiment of the present disclosure, a vehicle is provided. The vehicle comprising a plurality of ground engaging members including a first ski and a first track. The vehicle comprising a frame supported by the plurality of ground engaging members and a powertrain supported by the frame. The powertrain including a prime mover and a drive axle assembly operably coupled to the prime mover and configured to provide rotational force to the first track. The drive axle comprising a differential including a first output and a second output, a first axle coupled to the first output and a second axle coupled to the second output. The first axle including a first member and a second member, wherein the first member is coupled between the first output and the second member. The drive axle further comprising a first brake disc positioned on the first member and a first drive cog positioned on the second member.

In yet another embodiment of the present disclosure, a vehicle is provided. The vehicle comprising a plurality of ground engaging members including a first ski, a first track, and a second track wherein the first track and the second track are laterally spaced apart. The vehicle also comprising a frame supported by the plurality of ground engaging members, the frame including a tunnel assembly including a first tunnel, a second tunnel positioned on one lateral side of the first tunnel and vertically above the first track, and a third tunnel positioned on the other lateral side of the first tunnel and vertically above the second track. A powertrain is supported by the frame, the powertrain including a transmission and the powertrain is configured to provide rotational power to at least one of the first track and the second track. The powertrain assembly further comprising a fuel assembly configured to provide fuel to a prime mover, the fuel assembly including a fuel tank, and the fuel tank positioned within the first tunnel and laterally intermediate the first track and the second track.

In yet another embodiment of the present disclosure, a snowmobile is provided. The snowmobile comprising a plurality of ground engaging members comprising a first track assembly and a second track assembly. A frame is supported by the plurality of ground engaging members and a powertrain is supported by the frame. The powertrain includes a prime mover configured to provide power to at least one of the first track assembly and second track assembly. The powertrain further including a cooling assembly, the cooling assembly comprising a first cooler positioned vertically above the first track assembly and a second cooler positioned vertically above the second track assembly. The cooling assembly further comprising a pump operably coupled to the prime mover and a first conduit assembly fluidly coupling between the prime mover to the first cooler and second cooler.

In yet another embodiment of the present disclosure, a snowmobile is provided. The snowmobile comprising a plurality of ground engaging members and a frame supported by the plurality of ground engaging members. The frame including a tunnel assembly comprising a first tunnel portion positioned along a vehicle centerline and a second tunnel portion positioned on the other lateral side of the first tunnel portion. A powertrain is supported by the frame, the powertrain including a prime mover configured to provide power to at least one of the plurality of ground engaging members. The powertrain further including a cooling assembly, the cooling assembly comprising a first cooler positioned within the second tunnel portion, a second cooler positioned within the third tunnel portion and a pump operably coupled to the prime mover. The cooling assembly further comprising a first conduit assembly fluidly coupling between the prime mover to the first cooler and second cooler, and a first bleed valve positioned at a rear end portion of the first cooler and a second bleed valve positioned at a rear end portion of the second cooler.

In yet another embodiment of the present disclosure, a vehicle is provided. The vehicle comprising a plurality of ground engaging members and a frame supported by the plurality of ground engaging members. A powertrain supported by the frame, the powertrain configured to provide power to at least one of the ground engaging members. The powertrain comprising a prime mover, a transmission operably coupled to the prime mover, and the transmission having an input and an output. The powertrain further comprising an airbox fluidly coupled to the prime mover and a jackshaft operably coupled to the transmission output, the jackshaft extending through a portion of the airbox.

In yet another embodiment of the present disclosure, a snowmobile is provided. The snowmobile comprising a frame comprising a bulkhead and a tunnel assembly and a first ground engaging member coupled to the bulkhead and a second ground engaging member coupled to the tunnel assembly. The tunnel assembly comprising a plurality of longitudinally extending panels including a first outer side panel positioned at a first lateral extent of the tunnel assembly, a second outer side panel positioned at a second lateral extent of the tunnel assembly. The second ground engaging member positioned laterally intermediate the first outer side panel and the second outer side panel. The tunnel assembly further comprising a floor pan defining a portion of a footrest area and a forward extent of floor pan positioned longitudinally forward of the second ground engaging member. The floor pan is coupled to the bulkhead and at least one of the plurality of longitudinally extending panels, the floor pan having a lateral profile extending from the first outer side panel to the second outer side panel.

DETAILED DESCRIPTION OF THE DRAWINGS

Figure 1:
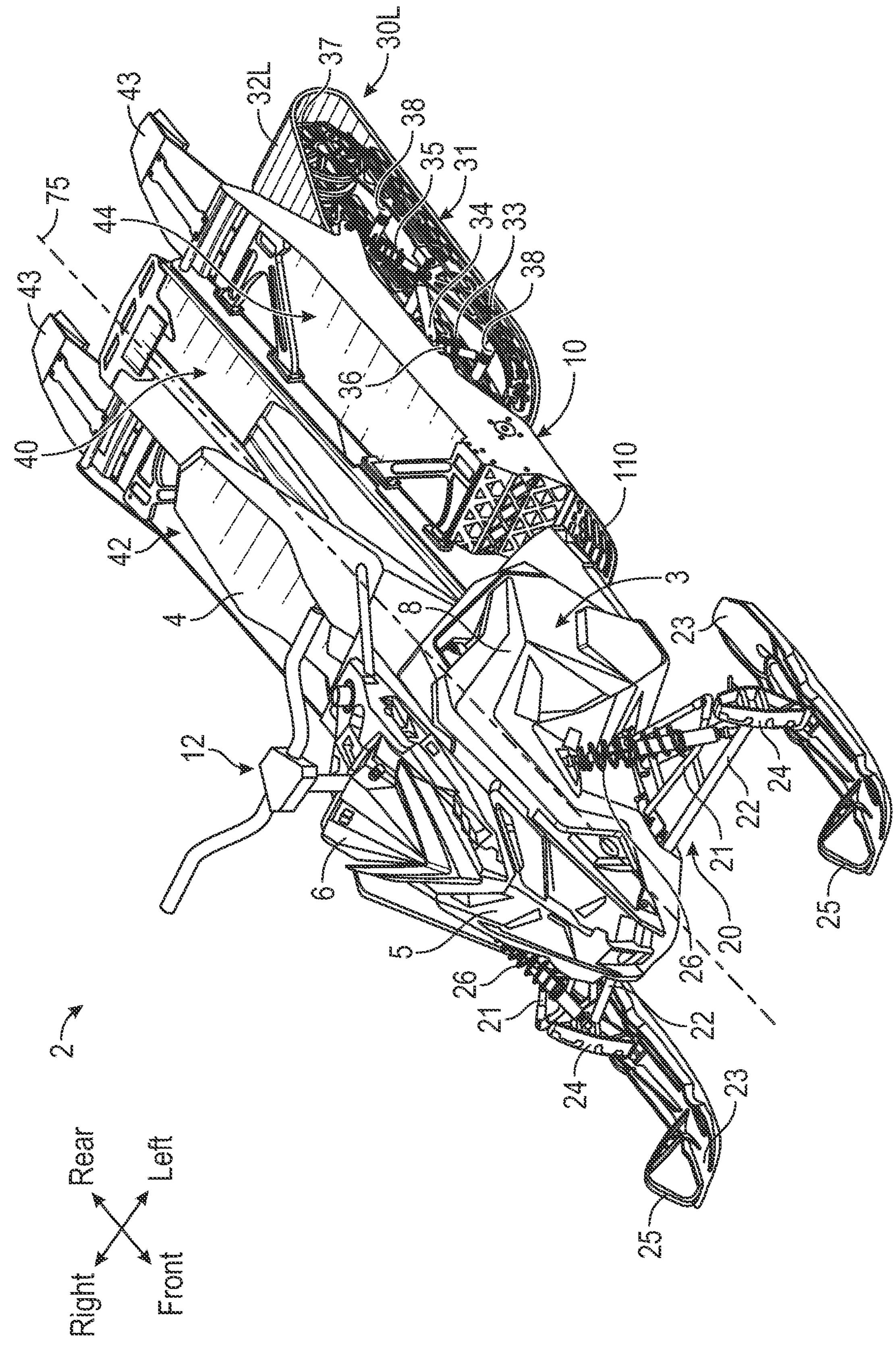
FIG. 1 is a front left perspective view of a vehicle of the present disclosure.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but yet still cooperates or interact with each other). "Nominal" or "nominally" related quantities have minimal or negligible variation from the perfect expression of their relationship. Such variation may be within typical engineering tolerances relevant to any particular quantity. For example, nominally equal quantities may be within 1%, 0.5% or 0.1% of being perfectly equal. As another example, nominally parallel structures or constructs may be within 2 degrees, 1 degree, 0.5 degrees or 0.1 degrees of perfectly parallel.

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

Figure 2:
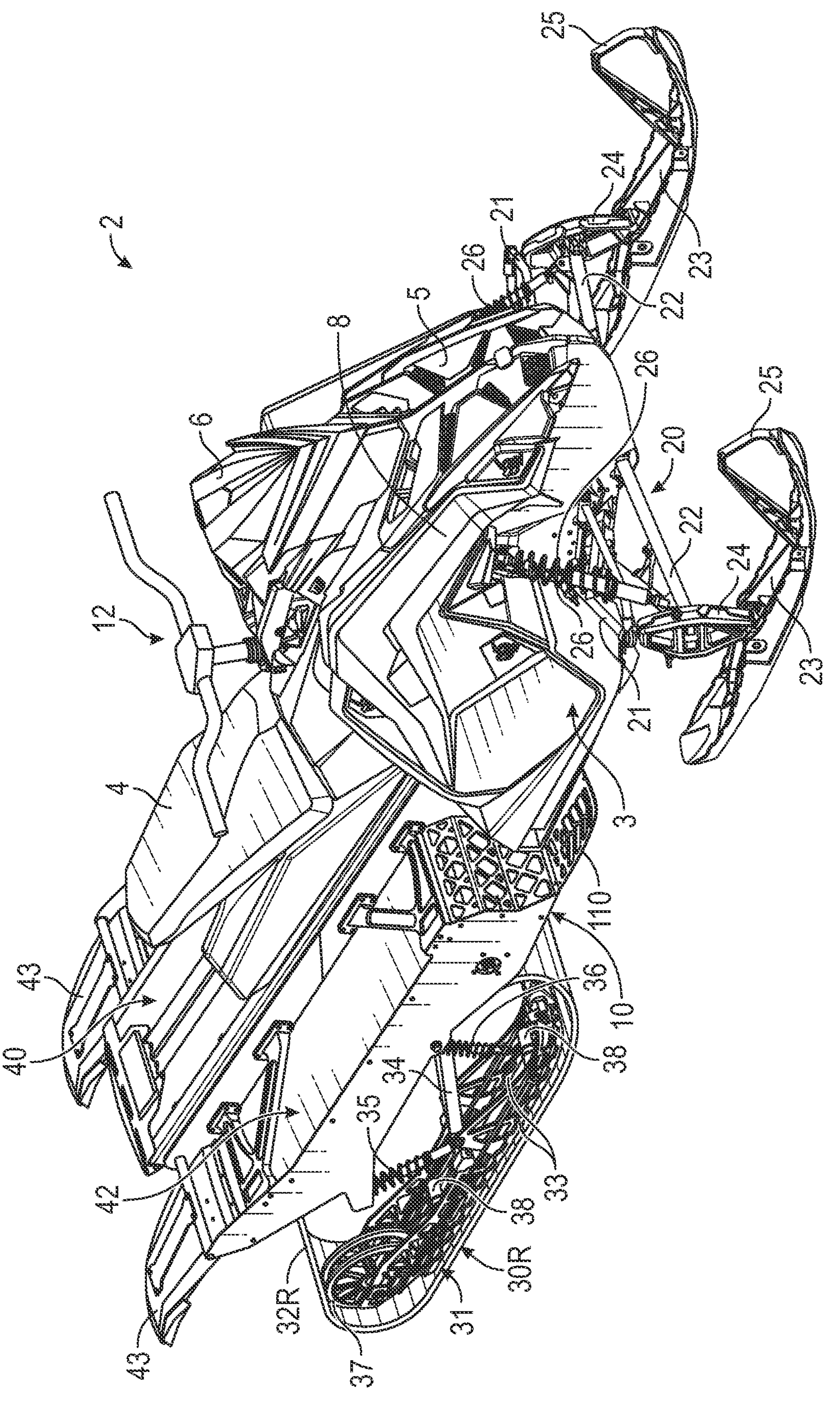
FIG. 2 is a front right perspective view of the vehicle of FIG. 1.

With reference to FIGS. 1-4, a vehicle 2 of the present disclosure will be described. Vehicle 2 comprises a frame 10 (FIG. 4) supported by a front suspension 20 and a rear suspension 30L (FIG. 1), 30R (FIG. 2). Front suspension 20 includes a pair of upper control arms 21 and a pair of lower control arms 22. Upper control arms 21 and lower control arms 22 are coupled between frame 10 and a left spindle 24, and between frame 10 and a right spindle 24. Spindles 24 each have a lower end coupled to one of a pair of skis 23. As illustrated, vehicle 2 includes two skis 23. In various embodiments, vehicle 2 may include a single ski, three skis or more skis. Each ski 23 includes a hook 25 configured to be used to tow, pull, or otherwise maneuver vehicle 2. Front suspension 20 also includes a pair of shock absorbers 26, wherein each shock absorber 26 extends between frame 10 at shock mounting point 27 (FIG. 4) and lower control arm 22. In various embodiments, shock absorber 26 couples between frame 10 at shock mounting point 27 and upper control arm 21. In various embodiments, shock absorber 26 couples between frame 10 at shock mounting point 27 and spindle 24. Skis 23 can be steered via a steering assembly (not shown) including a steering input 12. An operator (not shown) of vehicle 2 may provide a steering force to steering input 12 which operates a steering linkage (not shown) operably coupled to steer skis 23.

The rear suspension assembly includes a left rear suspension 30L and a right rear suspension 30R. Left rear suspension 30L and right rear suspension 30R are identical or substantially similar. Each of rear suspensions 30L, 30R includes a skid 31 comprising at least one rail 33. In various embodiments, each skid 31 includes a single rail, a pair of rails, three rails or more rails. In the present embodiment, a pair of rails 33 are coupled by a plurality of supports 38. Each rear suspension 30L, 30R includes a front torque arm 34. Front torque arm 34 extends between the skid 31 and frame 10. Torque arm 34 rotates relative to skid 31 and frame 10. Further, a front shock absorber 36 extends between the rails 33 and front torque arm 34, thereby damping rotation of torque arm 34. A rear shock absorber 35 extends between rails 33 and the frame 10. Front shock absorber 36 and rear shock absorber 35 extend and compress to provide a smoother ride to an operator and any passengers of vehicle 2. Rear suspensions 30L and 30R each also include an idler wheel 37 configured to help a track 32 rotate around skid 31. Rear suspensions 30L and 30R may also include a limiter strap assembly (not shown) which may be positioned to limit or dampen the upward movement of front torque arm 34. Additional details regarding the front suspension 20 and rear suspensions 30L, 30R and the operation thereof may be found in U.S. application Ser. No. 17/325,062, filed May 19, 2021, published as US Publication No. 2021/0362806, and U.S. application Ser. No. 16/244,048, filed Jan. 9, 2019, published as US Publication No. 2019/0210669, the entire disclosures of which are expressly incorporated herein.

Figure 3:
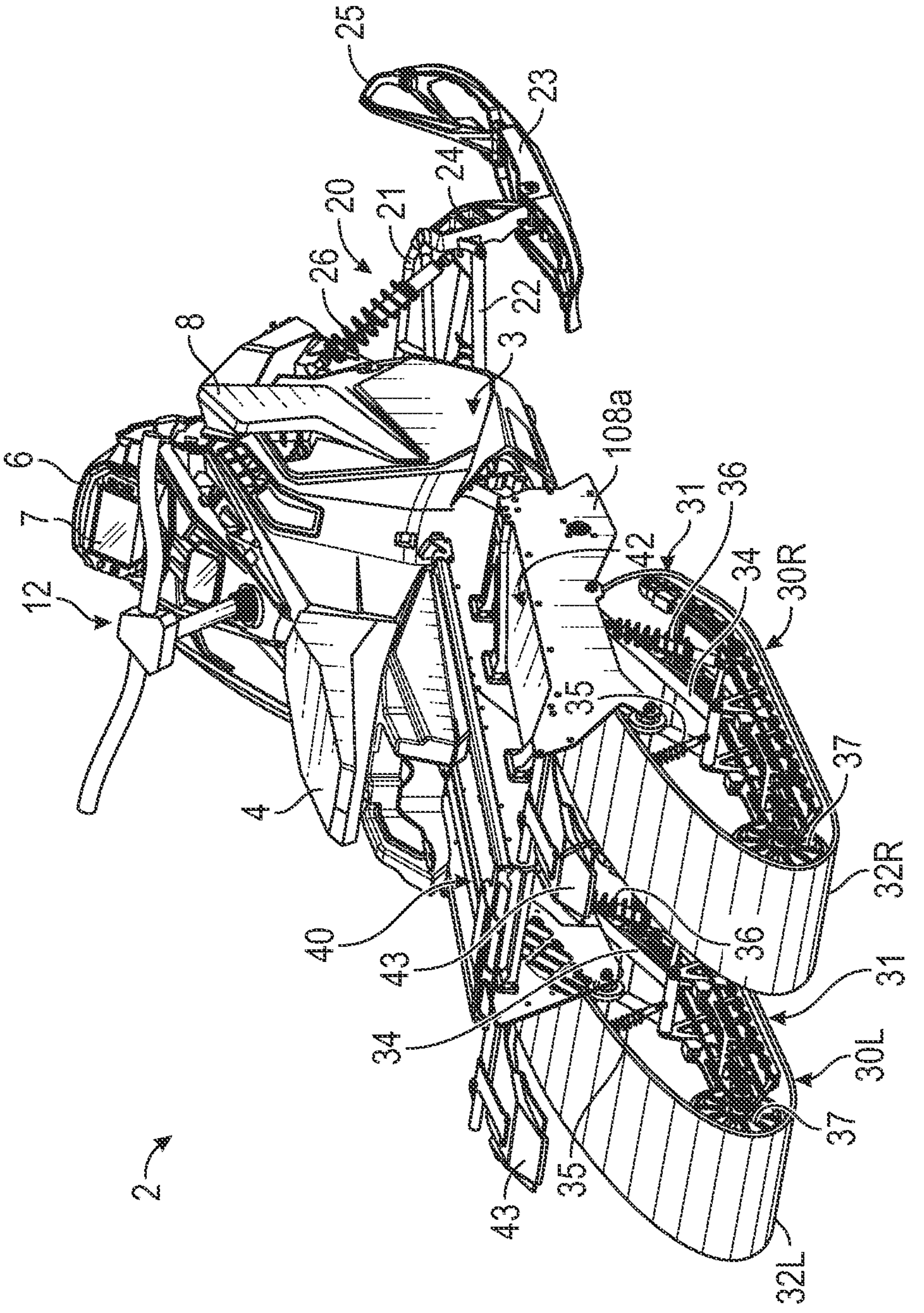
FIG. 3 is a rear right perspective view of the vehicle of FIG. 1.

Still referring to FIGS. 1-4, vehicle 2 includes a body assembly 3 supported by the frame 10. Body assembly 3 includes a hood 5 and an upper pod 6 which includes a display 7 (FIG. 3). Body assembly 3 may also include side panels 8 which may be removable from vehicle 2. Display 7 is configured to be at an ergonomic level for an operator (not shown) to view display 7 while riding vehicle 2. Vehicle 2 includes a seat 4 supported by frame 10 configured to support an operator and/or a passenger of vehicle 2. Steering input 12 extends upward at a position rearward of display 7. Steering input 12 may be configured as a handlebar, a pair of handlebars, a steering wheel, or other steering input.

Figure 7:
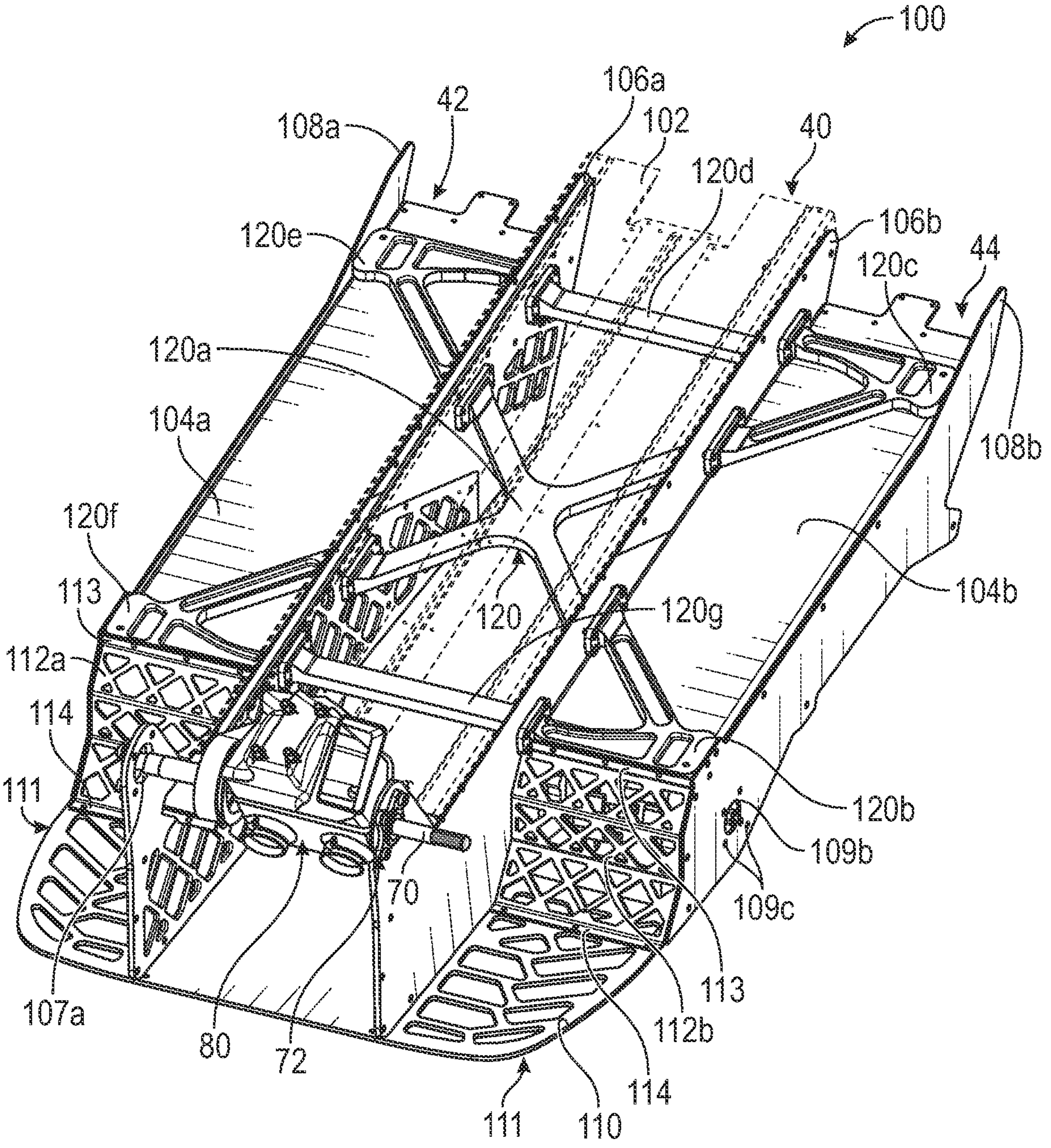
FIG. 7 is a front left perspective view of a portion of the frame including a tunnel assembly of the vehicle of FIG. 1.

Frame 10 of vehicle 2 will now be described in greater detail with reference to FIGS. 4 and 7-9. Frame 10 includes a tunnel assembly 100 and a bulkhead 11. As shown in FIG. 7, tunnel assembly 100 includes a first tunnel, or center tunnel 40, a second tunnel, or first side tunnel 42, and a third tunnel, or second side tunnel 44. Center tunnel 40 is positioned along a vehicle centerline 75 which extends along the longitudinal axis of vehicle 2 and generally bisects vehicle into equal-sized left and right sides. First side tunnel 42 is positioned on a first side of center tunnel 40 relative to vehicle centerline 75 and second side tunnel 44 is positioned on the other side of center tunnel 40 relative to vehicle centerline 75. In the illustrated embodiment, first side tunnel 42 is positioned on the right side of the center tunnel 40 and the second side tunnel 44 is positioned on the left side of the center tunnel 40, from the perspective of an operator of vehicle 2. In the present embodiment, seat 4 is positioned on center tunnel 40. In the present embodiment, each of first side tunnel 42 and second side tunnel 44 includes a snow flap 43 positioned at the rear thereof. First side tunnel 42 is positioned vertically above at least a portion of right rear suspension 30R and second side tunnel 44 is positioned vertically above at least a portion of left rear suspension 30L.

In the present embodiment, both left rear suspension 30L and right rear suspension 30R support tracks 32 that surround skids 31 and a drive axle 150. Powertrain 48 provides rotational power to drive axle 150, as further described below, which rotates track 32 and provides propulsion to vehicle 2. Each of left rear suspension 30L and right rear suspension 30R are coupled to frame 10 independent of each other and may move and articulate independently of each other.

Frame 10 includes bulkhead 11 positioned forward of tunnel assembly 100 and configured to support various additional systems and components at the front of vehicle 2 and link such components to the rest of the frame 100. Bulkhead includes engine mounts (not shown), suspension mounts (e.g. shock mounting point 27), steering supports (not shown), a pair of transition brackets 13 and other structural members. Bulkhead 11 may be made of cast components, printed components, stamped components, or any other method of manufacture and may be made of steel, aluminum, or of any other suitable material. Bulkhead 11 also includes transition brackets 13 positioned at a lower rearward position thereof. Transition bracket 13 may be integrally formed with bulkhead 11 or may be coupled using a fastener, a weld, adhesive, or other method of coupling.

Figure 4:
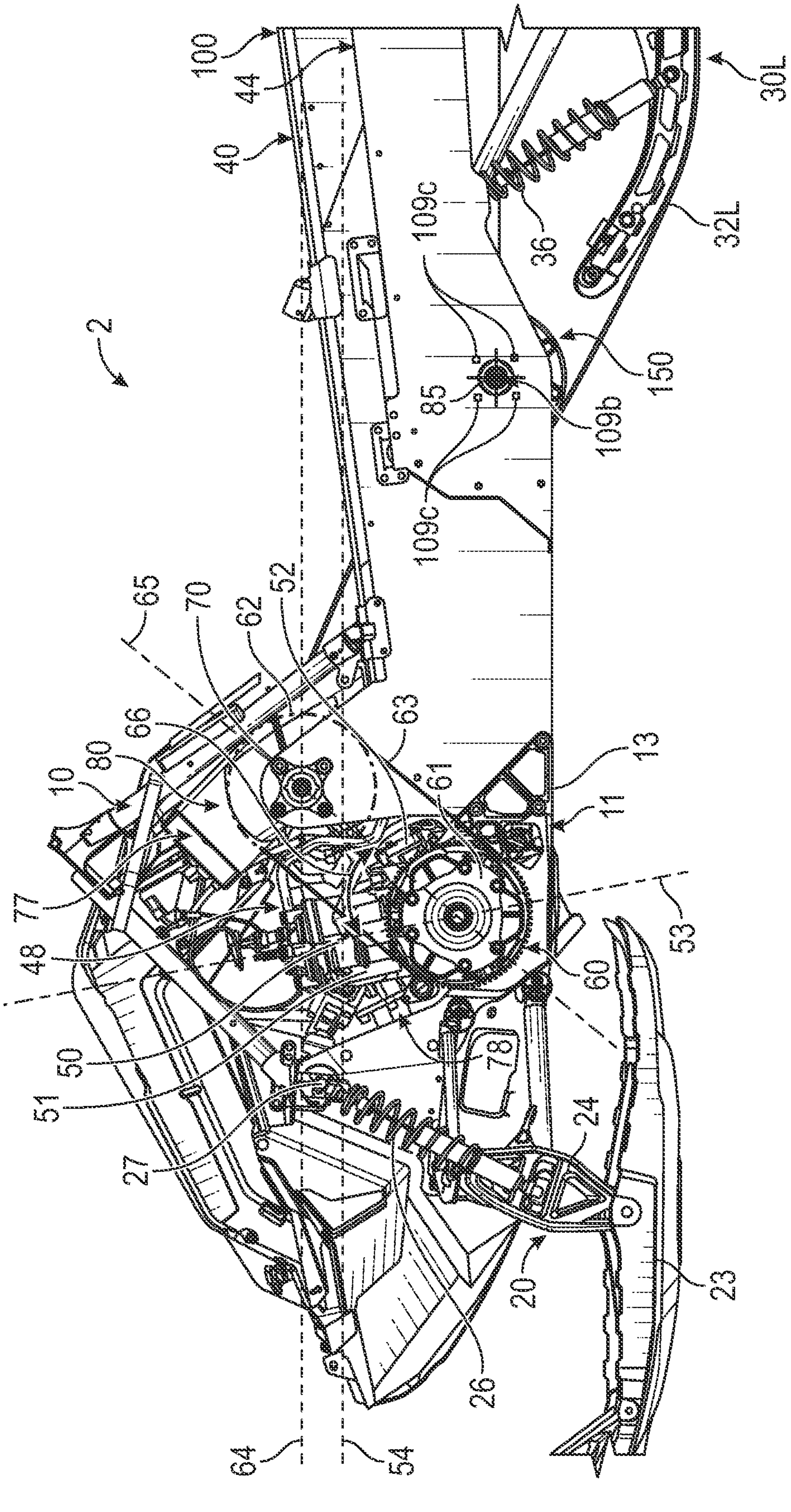
FIG. 4 is a left-side elevation view of the vehicle of FIG. 1 with a side panel removed.
Figure 15:
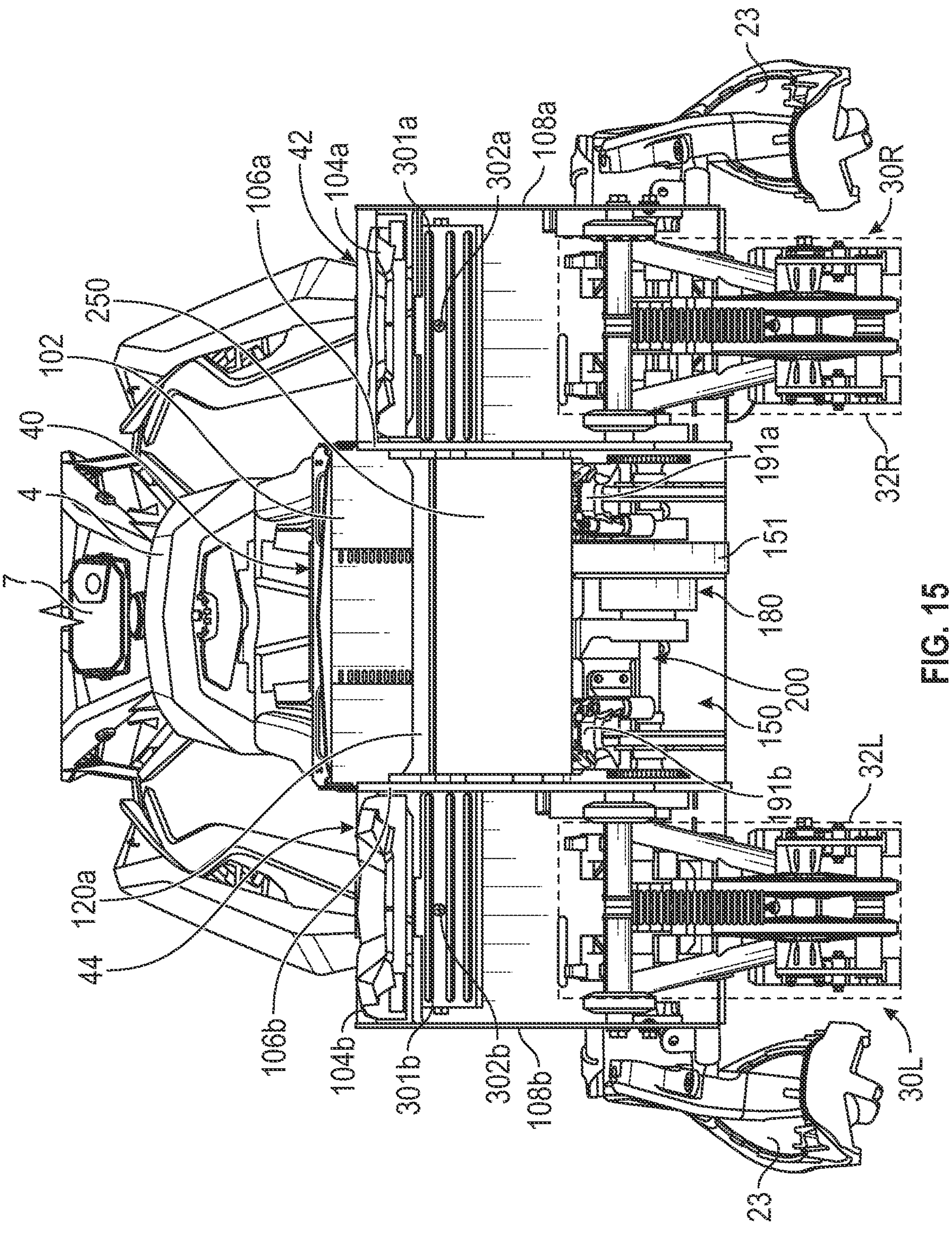
FIG. 15 is a rear elevation view of the vehicle of FIG. 1.

As best seen in FIG. 4, powertrain 48 includes a prime mover 50 supported by frame 10 and positioned forward of tunnels 40, 42, 44. In the present embodiment, prime mover 50 is supported by the bulkhead 11 via engine mounts (not shown). In the present embodiment, prime mover 50 is an internal combustion engine with an air intake assembly 77 and an exhaust assembly 78. Air intake assembly 77 extends generally rearward from prime mover 50 and exhaust assembly 78 extends generally forward from prime mover 50. In various embodiments, prime mover 50 is an electric motor or other means of motive force. Powertrain 48 also includes a fuel assembly which includes a fuel tank 250 (FIG. 15). The fuel assembly is configured to provide fuel to prime mover 50. Additional details regarding powertrains for snowmobiles may be found in U.S. Application No. 63/295,560, filed Dec. 31, 2021; U.S. application Ser. No. 16/691, 995, filed Nov. 22, 2019, now U.S. Pat. No. 11,174,779, issued Nov. 16, 2021, the entire disclosures of which are expressly incorporated herein.

Powertrain 48 includes a transmission 60 operably coupled to prime mover 50, as shown in FIG. 4. Illustratively, transmission 60 is a continuously variable transmission (CVT) which includes an input, or drive pulley 61 and an output, or driven pulley 62. Drive pulley 61 is directly coupled to an output of the prime mover 50 and driven pulley 62 is operably coupled to drive pulley 61 by a belt 63. Driven pulley 62 is rotatable about a generally horizontal axis positioned at a defined vertical height, and a horizontal plane 64 is coincident with the axis of pulley 62 and also at the defined vertical height.

Prime mover 50 comprises a housing 51 and includes at least one cylinder (not shown) in housing 51 and a piston (not shown) positioned in each cylinder wherein the piston is configured to reciprocate within the cylinder along a piston axis 53. Prime mover 50 also includes intake assembly 77 comprising a throttle body 52 and an airbox 80. An upper extent of throttle body 52 is positioned at a vertical height defined by a horizontal plane 54. As best seen in FIG. 4, horizontal plane 64 is positioned vertically higher than horizontal plane 54. That is, the driven pulley 62 rotates about an axis positioned vertically higher than an upper extent of the throttle body 52. Further, horizontal plane 64 is positioned vertically higher than the upper extent of shock absorber 26. Further, a clutch axis 65 extends between the drive clutch axis and the driven clutch axis, and an angle 66 is defined as the angle between clutch axis 65 and piston axis 53 when viewed from the side. In the present embodiment, angle 66 is less than 60 degrees. In various embodiments, angle 66 is between 40-60 degrees. In an exemplary embodiment, angle 66 is approximately 51 degrees.

1. Airbox

Figure 5:
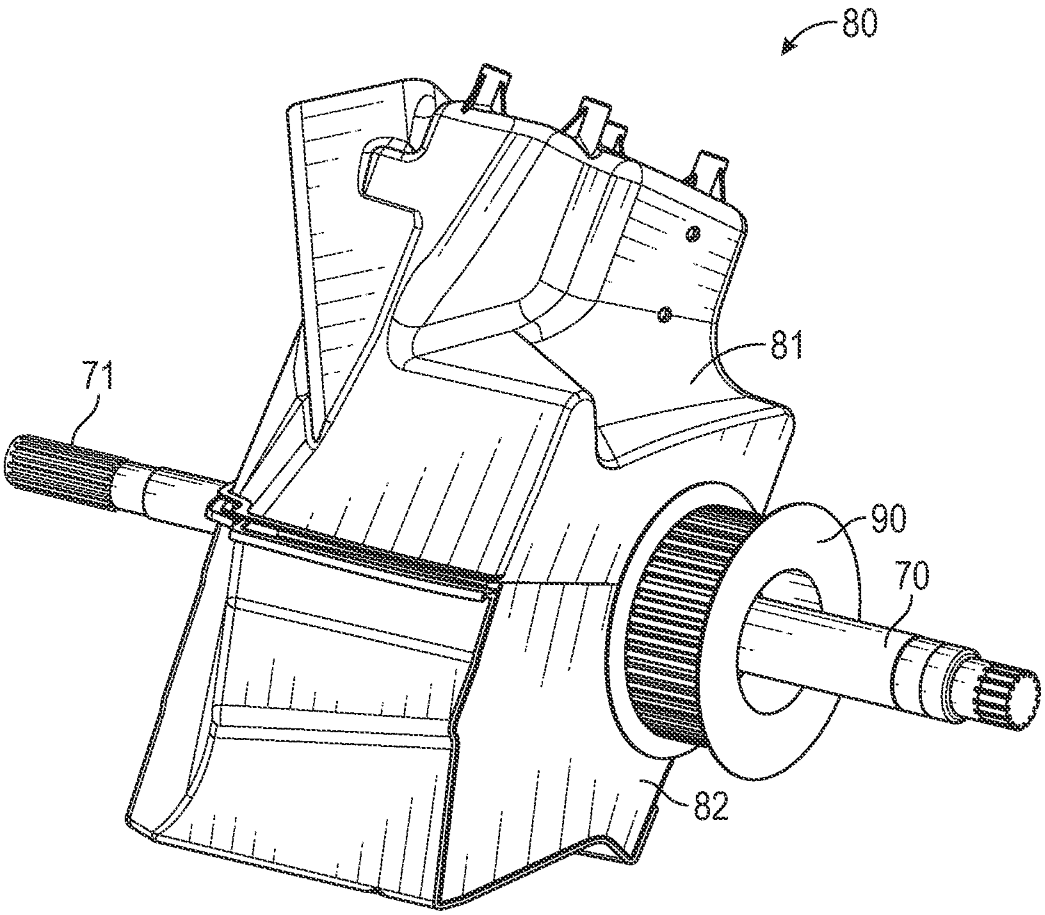
FIG. 5 is a perspective view of a portion of the powertrain including an airbox and a jackshaft of the vehicle of FIG. 1.
Figure 6:
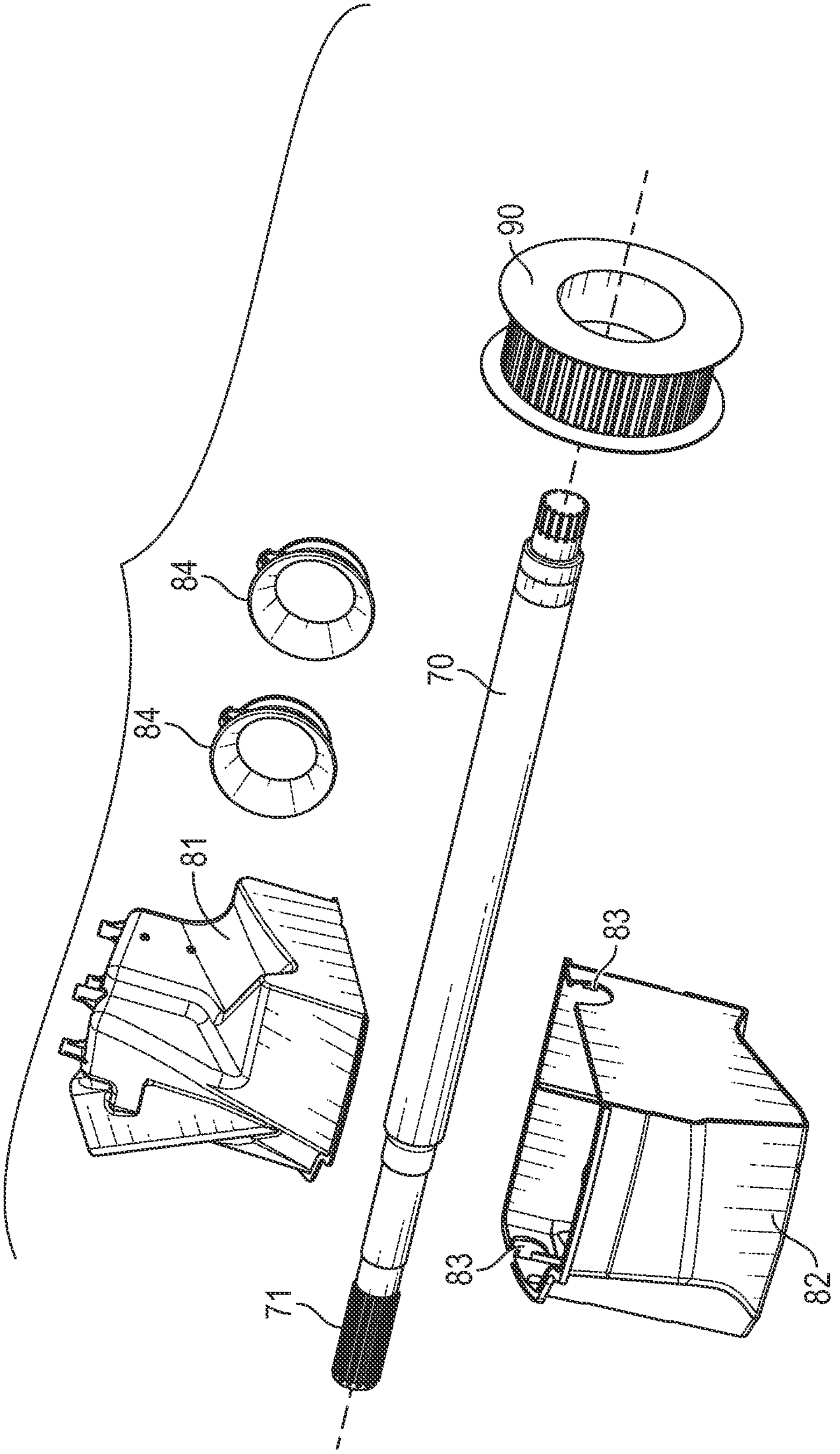
FIG. 6 is an exploded view of the airbox and jackshaft of FIG. 5.

Now referring to FIGS. 5-6, airbox 80 will be explained in greater detail. As best seen in FIG. 4, airbox 80 is positioned generally above and rearward of prime mover 50. Further, a portion of airbox 80 is at least partially generally aligned in a vertical and a horizontal direction with driven pulley 62, such that jackshaft 70 passes through the internal volume of airbox 80. Airbox 80 comprises an upper portion 81 and a lower portion 82 which are selectively separable to facilitate installation and service around the jackshaft 70. Either of upper portion 81 or lower portion 82 may be generally supported by frame 10, a portion of the body assembly 3, throttle body 52 or a combination thereof. Further, lower portion 82 includes outlets 84 (FIG. 6) which are coupled to throttle body 52 using a worm gear clamp (not shown). Lower portion 82 includes a pair of opposing u-shaped openings 83 which receive a jackshaft 70. Jackshaft 70 is operably coupled to driven pulley 62 such that jackshaft 70 rotates with driven pulley 62. Upper portion 81 is configured to rest on, and mate with, lower portion 82 so that the internal volume of the airbox 80 is created by a combination of upper portion 81 and lower portion 82. When upper portion 81 and lower portion 82 are assembled, jackshaft 70 extends through openings 83 and through the internal volume, while rotating together with driven pulley 62 and drive sprocket 90 (described below). In various embodiments, upper portion 81 and lower portion 82 are removably coupled together using a clamp, a fastener, a rubber pull strap, another locking device, or another retention device.

Jackshaft 70 includes a plurality of splines on a first end 71 configured to engage driven pulley 62 to rotatably couple pulley 62 and jackshaft 70. Additionally, a drive sprocket 90 is configured to rotatably couple to jackshaft 70. Drive sprocket 90 may be coupled to jackshaft using a taper bushing (not shown), though other coupling methods such as an adhesive, a weld, a spline, or other coupling method may be used. In this way, jackshaft 70 transfers torque between driven pulley 62 and drive sprocket 90. In the illustrated embodiment, a portion of airbox 80 is positioned on vehicle centerline 75 (FIG. 9), drive sprocket 90 is positioned on a first lateral side of airbox 80 and the transmission 60 is positioned on the other lateral side of airbox 80. In various embodiments, a seal and/or gasket is positioned between the upper portion 81 and the lower portion 82 of airbox 80. It may be appreciated that openings 83 are sized commensurate to the diameter of jackshaft 70 so that openings 83 are slightly larger than jackshaft 70. In various embodiments, a seal may be positioned around openings 83 to create a better seal within airbox 80. In various embodiments, a single bushing or a plurality of bushings may be positioned in openings 83 to support jackshaft 70.

Airbox 80 is constructed of upper portion 81 and lower portion 82 to allow an optimal position for jackshaft 70 while maintaining a larger volume within airbox 80. That is, the two-piece construction of airbox 80 facilitates occupation of a common spatial volume by both airbox 80 and jackshaft 70, promoting a compact and efficient spatial layout for the other systems of vehicle 2. Further, airbox 80 may then be assembled and disassembled around the jackshaft 70. In one example, upper portion 81 may be removed and lower portion 82 may subsequently be rotated upwardly and rearwardly around jackshaft 70 to remove lower portion 82 while jackshaft 70 is installed. This allows access for maintenance to airbox 80 while jackshaft 70 is still installed.

2. X-Brace and Floor Pan

Figure 8:
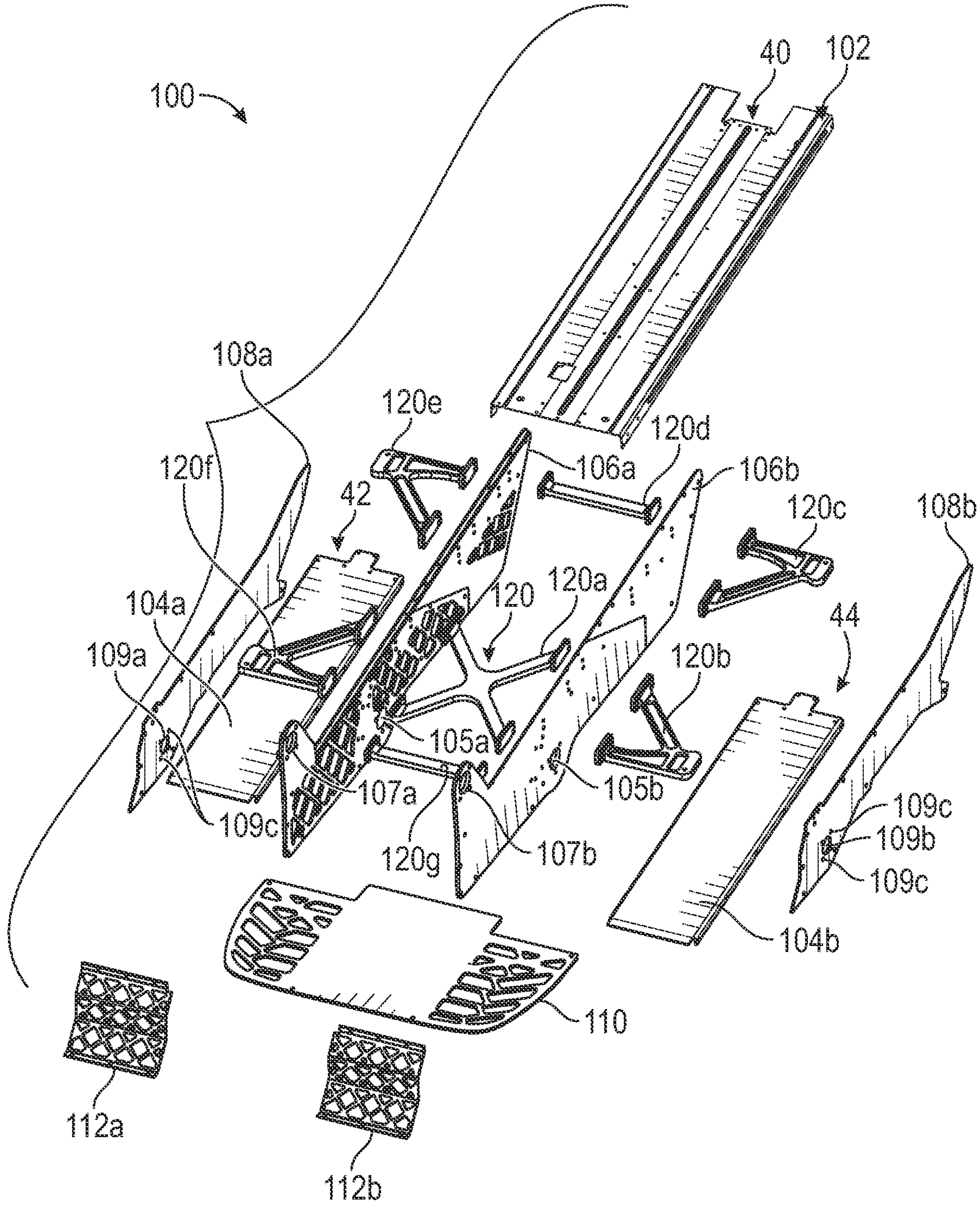
FIG. 8 is an exploded view of the portion of the frame of FIG. 7.
Figure 9:
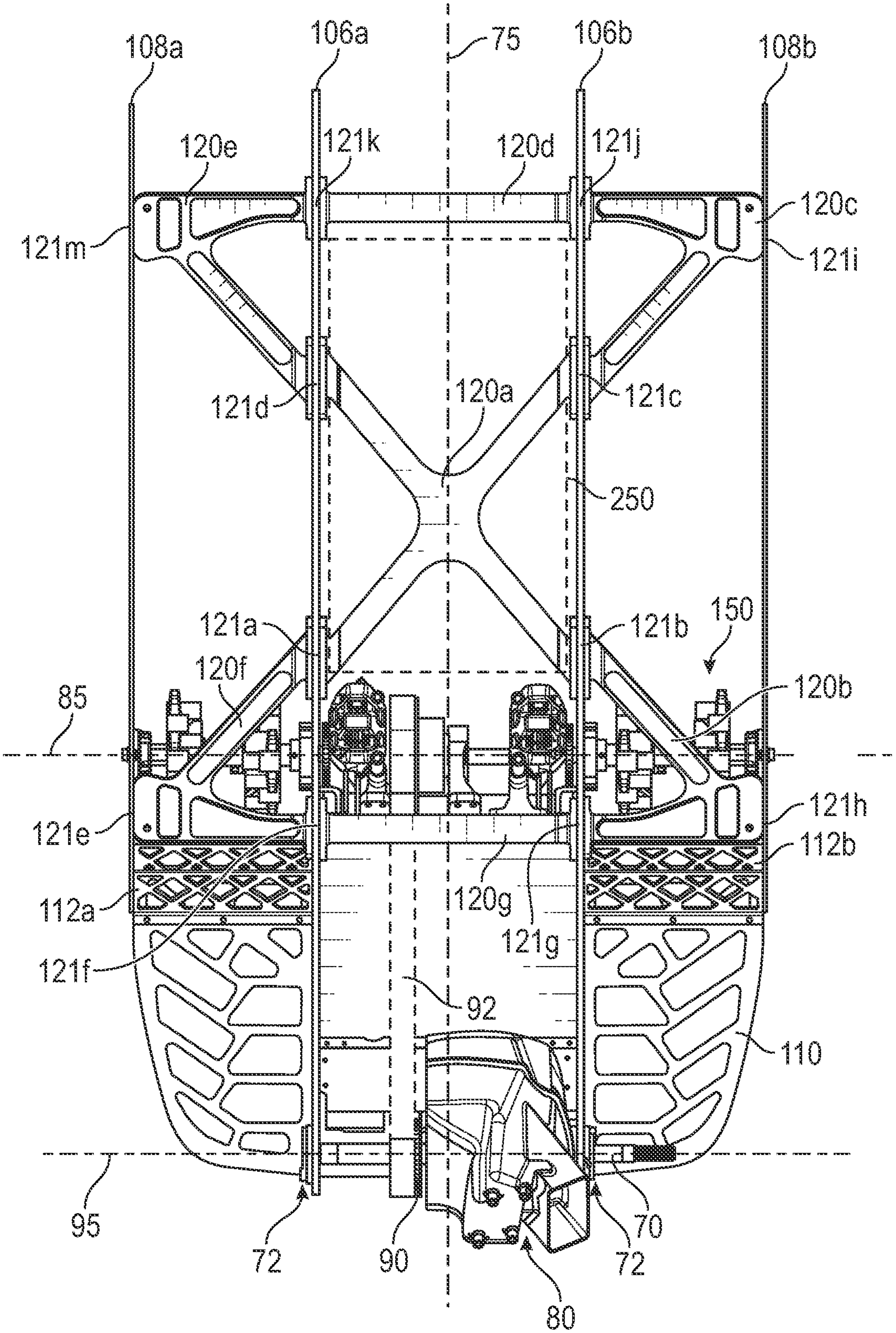
FIG. 9 is a top plan view of a portion of the rear area of the vehicle of FIG. 1.
Figure 10:
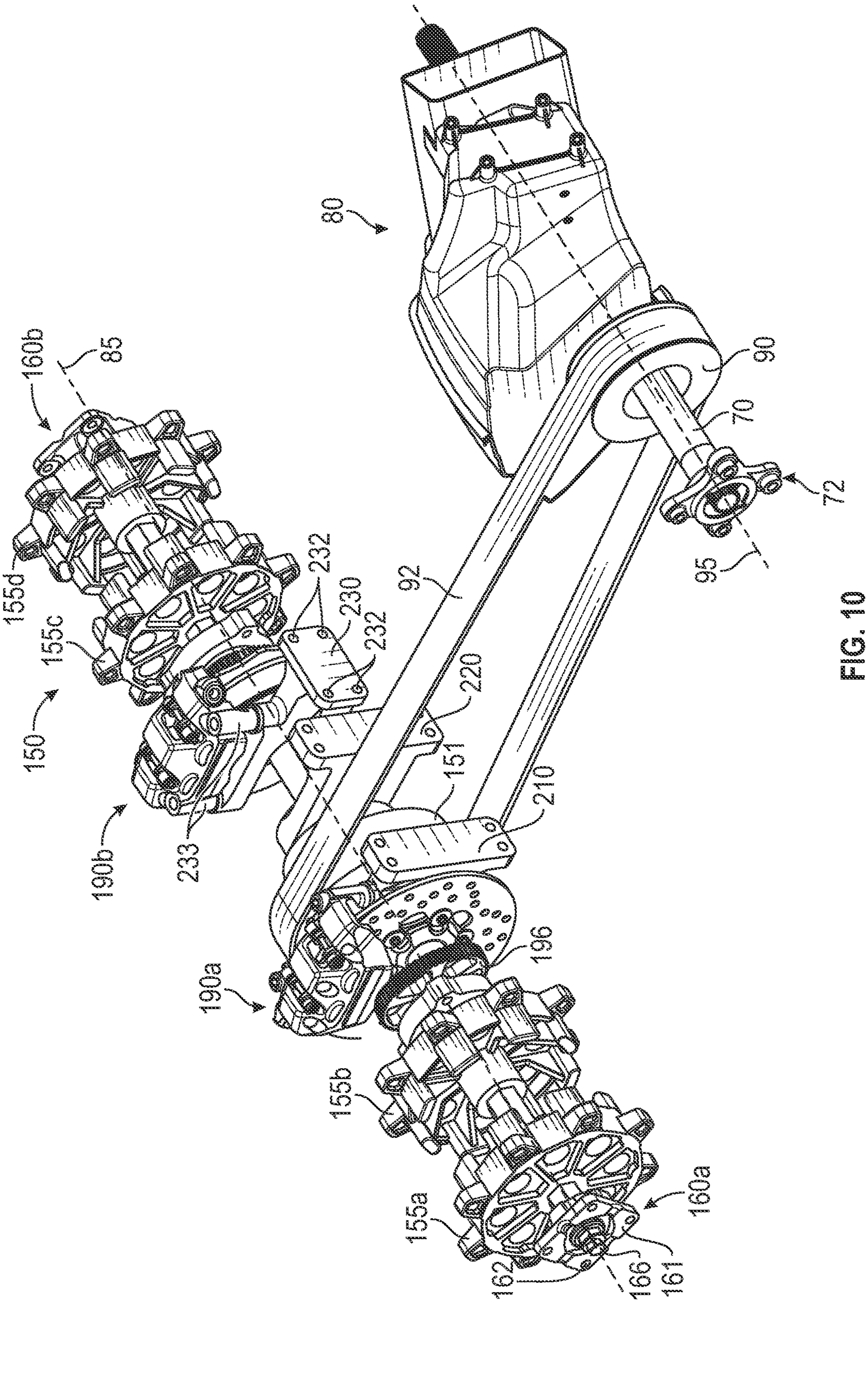
FIG. 10 is a perspective view of a portion of the powertrain of the vehicle of FIG. 1.

Referring now to FIGS. 7-9, tunnel assembly 100 of frame 10 (FIG. 4) will be explained in greater detail. Tunnel assembly 100 includes center tunnel 40, first side tunnel 42, and second side tunnel 44. Center tunnel 40 includes a center cover 102 which extends between a pair of longitudinally extending panels, or center tunnel panels 106 as shown in FIGS. 7 and 8. Illustratively, a pair of laterally spaced center tunnel panels 106 are shown as a right center tunnel panel 106*a* and a left center tunnel panel 106*b* which extend the majority of the length of tunnel assembly 100 and are nominally parallel to each other. Center cover 102 is fixed to center tunnel panels 106 through fasteners, welds, adhesives or other methods of coupling. Illustratively, center cover 102 is coupled to an upper portion of center tunnel panels 106.

First side tunnel 42 includes a side cover 104*a* and second side tunnel 44 includes a side cover 104*b* which are respectively fixed (e.g., welded or fastened) to adjacent outer surfaces of center tunnel panels 106*a* and 160*b*. Illustratively, side cover 104*a* extends to the right outwardly from right center tunnel panel 106*a* and side cover 104*b* extends to the left outwardly from left center tunnel panel 106*b*. Side covers 104 are shorter in a longitudinal direction than center cover 102. Side covers 104*a*, 104*b* are positioned at least partially over right rear suspension 30R and left rear suspension 30L, respectively, as generally illustrated in FIGS. 1 and 2. Side covers 104 are fixed to center tunnel panels 106 to extend longitudinally along a forward-to-back orientation, and are positioned vertically lower than the center cover 102.

Tunnel assembly 100 also includes a pair of outer side panels 108 fixed (e.g., by welding or fastening) to an outer edge of side covers 104. Illustratively, an outer side panel 108*a* is coupled to side cover 104*a* and an outer side panel 108*b* is coupled to side cover 104*b*. In the illustrated embodiment, side panels 108 are parallel to one another and to center panels 106. In an installed configuration, outer side panels 108*a*, 108*b*, side covers 104*a*, 104*b*, center tunnel panels 106*a*, 106*b*, and center cover 102 create a protective housing with left, right and center compartments, in which the right and left compartments are sized to accommodate rear suspensions 30R, 30L. Outer side panels 108 each include an opening 109. Outer side panel 108*a* includes an opening 109*a* and outer side panel 108*b* includes an opening 109*b* designed to precisely position drive axle 150 relative to jackshaft 70, as further described below. Outer side panel 108*a* forms a first outer lateral side surface of the tunnel assembly 100, and outer side panel 108*b* forms a second outer lateral side surface of the tunnel assembly 100 opposite the first outer lateral side surface.

First side tunnel 42 includes a front panel 112*a*, and second side tunnel 44 includes a front panel 112*b*. Front panels 112*a*, 112*b* are shaped to conform to the front edge profile of outer side panels 108*a*, 108*b*, respectively to create a continuous, multifaceted seam as best seen in FIG. 7. Illustratively, front panels 112*a*, 112*b* have a slanted and stepped profile when viewed from the side such that a bottom edge 114 of front panels 112*a*, 112*b* are positioned longitudinally forward of an upper edge 113 of front panels 112*a*, 112*b*. In the illustrated embodiment, front panel 112 is removably coupled between center tunnel panel 106, side cover 104, outer side panel 108 and a floor pan 110 using fasteners. In various embodiments, front panel may be coupled to center tunnel panel 106, side cover 104, outer side panels 108 and floor pan 110 using an adhesive, a weld, or other method of coupling.

Tunnel assembly 100 also includes floor pan 110. Floor pan 110 is positioned at a front extent of tunnel assembly 100. Floor pan 110 is fixed to the bottom of tunnel assembly 100 through the use of fasteners (not shown), though other methods of affixation may be used (e.g., welding). Floor pan 110 is also fixed to bulkhead 11 at transition brackets 13 and thereby forms a connection between bulkhead 11 and tunnel assembly 100 at a bottom portion of frame 10. As best seen in FIG. 9, floor pan 110 occupies a lateral and longitudinal open space at the forward corners of tunnel assembly 100, creating room for an operator's legs and feet within the overall structure of tunnel assembly 100. That is, floor pan 110 extends laterally from a first of the outer side panels 108 to the other of the outer side panels 108. That is, floor pan 110 has a lateral profile extending from outer side panel 108*a* to outer side panel 108*b*. Further, floor pan 110 extends forward from front panel 112 to the front extent of center tunnel panels 106. Floor pan 110 adds rigidity to the bottom of tunnel assembly 100 by coupling between at least outer side panel 108*a*, front panel 112*a*, center tunnel panel 106*a*, center tunnel panel 106*b*, front panel 112*b*, and outer side panel 108*b*, creating a generally rectangular profile overall, as viewed from above. Further, a forward extent of floor pan 110 is longitudinally forward of the tracks 32R, 32L. Further, as best seen in FIG. 9, floor pan 110 is positioned vertically below jackshaft axis and floor pan 110 is longitudinally forward of drive axle axis 85. Further, at least a portion of airbox 80 is positioned vertically above floor pan 110.

As best seen in FIG. 7, floor pan 110 creates a footrest area 111 when coupled to the tunnel assembly 100. Illustratively, footrest area is defined by the area outside center tunnel panels 106, forward of front panel 112, and vertically above floor pan 110. Floor pan 110 also includes an arrangement of apertures or cutouts, as best seen in FIG. 9, which allow snow or debris to fall through and not build up in the footrest area 111.

Each of center cover 102, side covers 104*a*, 104*b*, center tunnel panels 106*a*, 106*b*, outer side panels 108*a*, 108*b*, and floor pan 110 may be made of a light weight material to reduce the overall weight of vehicle 2. A brace assembly 120 is provided to strengthen tunnel assembly 100. Brace assembly 120 is configured to span the majority or entirety of the lateral width of tunnel assembly 100 and the majority or entirety of the longitudinal length of tunnel assembly to rigidify tunnel assembly 100. Illustratively, brace assembly 120 is generally "X" shaped and generally extends to each corner of the generally rectangular tunnel assembly 100.

As seen in FIGS. 7-9, brace assembly 120 comprises a first or center brace 120*a*, a second or left-forward brace 120*b*, a third or left-rear brace 120*c*, a fourth or center-rear brace 120*d*, a fifth or right-rear brace 120*e*, a sixth or right-forward brace 120*f*, and a seventh or center-forward brace 120*g*. Illustratively, first brace 120*a* is generally in the shape of an "X" and extends between the center tunnel panels 106*a*, 106*b*. In the present embodiment, first brace 120*a* is positioned vertically below center cover 102, however, in another embodiment, first brace 120*a* may be positioned vertically above center cover 102. First brace 120*a* couples to center tunnel panels 106*a*, 106*b* at four mounting points, shown in FIG. 9, including a first mounting point 121*a*, a second mounting point 121*b*, a third mounting point 121*c*, and a fourth mounting point 121*d*. Each of the mounting points 121*a*, 121*b*, 121*c* and 121*d* are positioned at respect points or ends of the X-shape formed by the central mounting member 120*a*. Illustratively, first brace 120*a* couples to center tunnel panel 106*a* at first mounting point 121*a* and fourth mounting point 121*d* and couples to center tunnel panel 106*b* at second mounting point 121*b* and third mounting point 121*c*. Further, brace assembly 120 includes second brace 120*b* positioned forward and outside to the left relative to first brace 120*a*. Second brace 120*b* is generally an angle bracket forming a "V" shape. Second brace 120*b* is positioned between and fixed to center tunnel panel 106*b* and outer side panel 108*b*. Second brace 120*b* couples to center tunnel panel 106*b* at second mounting point 121*b* and a seventh mounting point 121*g* and couples to outer side panel 108*b* at an eighth mounting point 121*h*. Second brace 120*b* shares second mounting point 121*b* with first brace 120*a*. A fastener may extend through first brace 120*a* and second brace 120*b*, thereby coupling first brace 120*a* and second brace 120*b* on either side of center tunnel panel 106*b* which increases stiffness in the tunnel assembly 100. Further, providing additional coupling between center tunnel panel 106*b* and outer side panel 108*b* increases the torsional strength of tunnel assembly 100.

Third brace 120*c* is generally an angle bracket forming a "V" shape. Third brace 120*c* is positioned between and fixed to center tunnel panel 106*b* and outer side panel 108*b*. In the present embodiment, third brace 120*c* is positioned longitudinally rearward of second brace 120*b*. Third brace 120*c* couples to center tunnel panel 106*b* at third mounting point 121*c* and a tenth mounting point 121*j* and couples to outer side panel 108*b* at a ninth mounting point 121*i*. Third brace 120*c* shares third mounting point 121*c* with first brace 120*a*. A fastener may extend through brace 120*a* and third brace 120*c*, thereby coupling first brace 120*a* and third brace 120*c* on either side of center tunnel panel 106*b* which increases the stiffness of tunnel assembly 100. Further, providing additional coupling between center tunnel panel 106*b* and outer side panel 108*b* increases the torsional strength of tunnel assembly 100.

Fifth brace 120*e* is generally an angle bracket forming a "V" shape. Fifth brace 120*e* is positioned between and fixed to center tunnel panel 106*a* and outer side panel 108*a*. Fifth brace 120*e* couples to center tunnel panel 106*a* at fourth mounting point 121*d* and an eleventh mounting point 121*k* and couples to outer side panel 108*a* at twelfth mounting point 121*m*. Fifth brace 120*e* shares fourth mounting point 121*d* with first brace 120*a*. A fastener may extend through brace 120*a* and fifth brace 120*e*, thereby coupling first brace 120*a* and fifth brace 120*e* on either side of center tunnel panel 106 which increases stiffness of tunnel assembly 100. Further, providing additional coupling between center tunnel panel 106*a* and outer side panel 108*a* increases the torsional strength of tunnel assembly 100.

Sixth brace 120*f* is generally an angle bracket forming a "V" shape. Sixth brace 120*f* is positioned between and coupled to center tunnel panel 106*a* and outer side panel 108*a*. Sixth brace 120*f* couples to center tunnel panel 106*a* at first mounting point 121*a* and a sixth mounting point 121*f* and couples to outer side panel 108*a* at a fifth mounting point 121*e*. Sixth brace 120*f* shares first mounting point 121*a* with first brace 120*a*. A fastener may extend through brace 120*a* and sixth brace 120*f*, thereby coupling first brace 120*a* and sixth brace 120*f* on either side of center tunnel panel 106*a* which increases the stiffness of tunnel assembly 100. Further, providing additional coupling between center tunnel panel 106*a* and outer side panel 108*a* increases the torsional strength of tunnel assembly 100.

In various embodiments, second brace 120*b*, third brace 120*c*, fifth brace 120*e*, and sixth brace 120*f* are the same or substantially similar to facilitate easier manufacturing processes. In various embodiments, each mounting point 121*a-m* may utilize a fastener, a plurality of fasteners, a weld, adhesive, or other method of coupling.

Fourth brace 120*d* is directly coupled, e.g., fixed, between center tunnel panel 106*a* and center tunnel panel 106*b*. Fourth brace 120*d* is coupled to center tunnel panel 106*a* at mounting point 121*k* and also coupled to center tunnel panel 106*b* at mounting point 121*j*. Fourth brace 120*d* shares mounting point 121*k* on center tunnel panel 106*a* with fifth brace 120*e*, and a fastener may extend through both fourth brace 120*d* and fifth brace 120*e* to increase the rigidity of the tunnel assembly 100. Further, fourth brace 120*d* shares mounting point 121*j* on center tunnel panel 106*b* with third brace 120*c*, and a fastener may extend through both fourth brace 120*d* and third brace 120*c* to increase the rigidity of the tunnel assembly 100. The position of fourth brace 120*d* laterally intermediate third brace 120*c* and fifth brace 120*e* creates a stronger connection across the lateral width of tunnel assembly 100.

Seventh brace 120*g* is directly coupled, e.g., fixed, between center tunnel panel 106*a* and center tunnel panel 106*b*. Seventh brace 120*g* is coupled to center tunnel panel 106*a* at mounting point 121*f* and also coupled to center tunnel panel 106*b* at mounting point 121g. Seventh brace 120*g* shares mounting point 121*f* on center tunnel panel 106*a* with sixth brace 120*f*, and a fastener may extend through both seventh brace 120*g* and sixth brace 120*f* to increase the rigidity of the tunnel assembly 100. Further, seventh brace 120*g* shares mounting point 121g on center tunnel panel 106*b* with second brace 120*b*, and a fastener may extend through both seventh brace 120*g* and second brace 120*b* to increase the rigidity of the tunnel assembly 100. The position of seventh brace 120*g* laterally intermediate sixth brace 120*f* and second brace 120*b* creates a stronger connection across the lateral width of tunnel assembly 100.

In various embodiments, each of first brace 120*a*, second brace 120*b*, third brace 120*c*, fourth brace 120*d*, fifth brace 120*e*, sixth brace 120*f*, seventh brace 120*g* have distinct mounting points, and they mount at locations vertically or longitudinally offset from one another.

In various embodiments, first brace 120*a*, fourth brace 120*d*, and seventh brace 120*g* may be directly coupled to center cover 102, and second brace 120*b*, third brace 120*c*, fifth brace 120*e*, and sixth brace 120*f* may be directly coupled to side covers 104*a*, 104*b*.

In the present embodiment, drive axle 150 is coupled to seventh brace 120*g*. That is, seventh brace 120*g* supports a portion of the powertrain 48.

3. Drive Axle

Center tunnel panel 106*a* includes a first opening 105*a* (FIG. 8) and a second opening 107*a*, and center tunnel panel 106*b* includes a first opening 105*b* (FIG. 8) and a second opening 107*b*. Second openings 107*a*, 107*b* are positioned at a generally forward extent of center tunnel panels 106*a*, 106*b*, respectively. First openings 105*a*, 105*b* are positioned longitudinally rearward and vertically lower than second openings 107*a*, 107*b*, that is first openings 105*a*, 105*b* are spaced longitudinally front second openings 107*a*, 107*b*. A jackshaft axis 95 extends between the center points of second openings 107*a*, 107*b*, such that an axis defined by the openings 107*a*, 107*b* is nominally coincident with the axis 95 of jackshaft 70. Similarly, a drive axle axis 85 extends between first openings 105*a*, 105*b*, such that an axis defined by the openings 105*a*, 105*b* is nominally coincident with the axis 85 of drive axle assembly 150.

Figure 11:
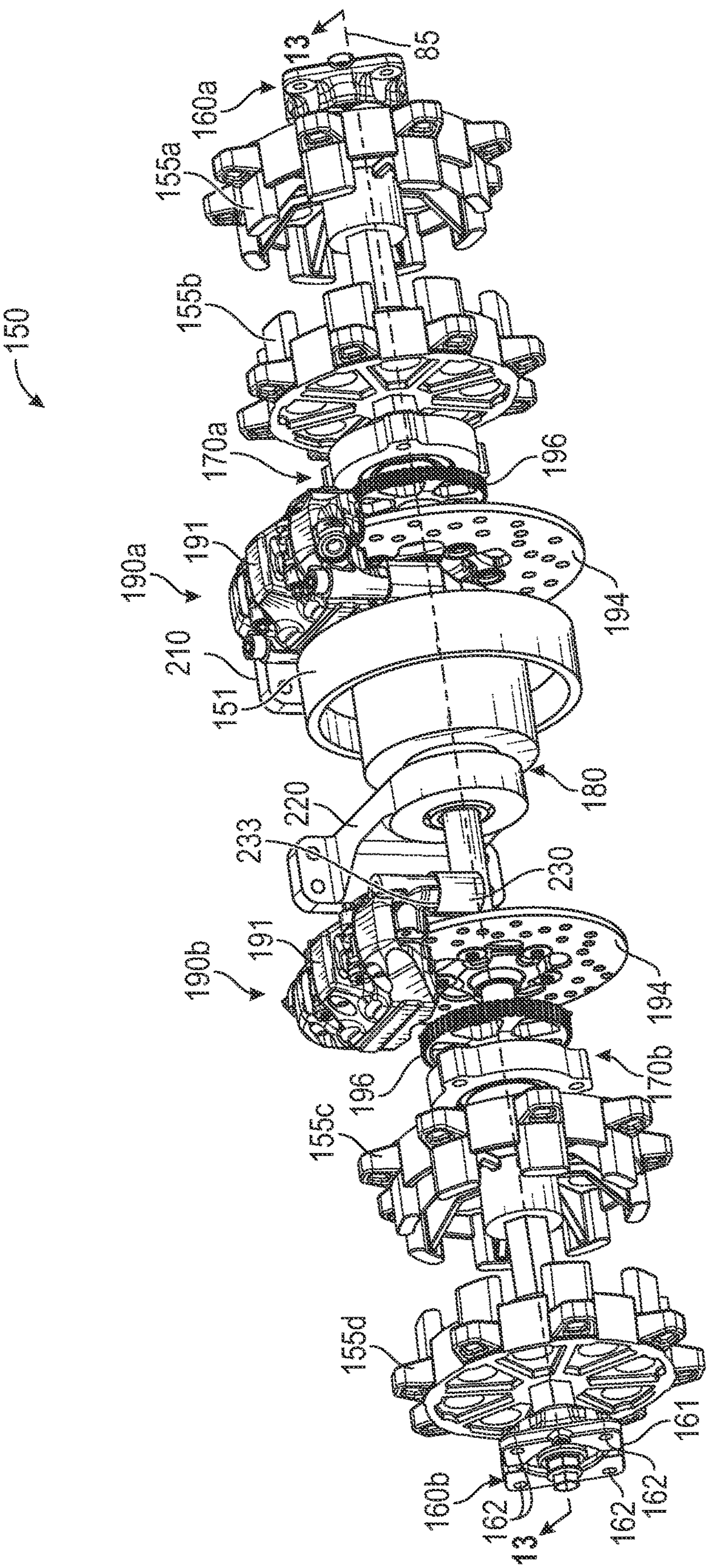
FIG. 11 is a perspective view of the drive axle assembly of the vehicle of FIG. 1.

Powertrain 48 includes drive axle assembly 150, shown in FIG. 11 and described further herein. Powertrain 48 provides power through transmission 60 to jackshaft 70. Jackshaft extends through openings 107*a*, 107*b* and is supported by center tunnel panels 106*a*, 106*b*. Airbox 80 surrounds a portion of jackshaft 70 as noted above, and therefore, at least a portion of airbox 80 is positioned laterally intermediate a portion of center tunnel panels 106*a*, 106*b* (FIG. 9). A bearing assembly 72 is coupled to each of center tunnel panels 106*a*, 106*b* and is positioned about jackshaft axis 95. Bearing assembly 72 is configured to support jackshaft 70. Drive sprocket 90 is positioned laterally intermediate center tunnel panels 106*a*, 106*b* and laterally intermediate bearing assemblies 72. Further, drive sprocket 90 is positioned offset from vehicle centerline 75 and is further positioned laterally intermediate vehicle centerline 75 and one of center tunnel panels 106*a*, 106*b*. In the present embodiment, airbox 80 is at least partially positioned on a first side of vehicle centerline 75 and drive sprocket 90 is positioned on the other side of vehicle centerline 75. In the present embodiment, airbox 80 and drive sprocket 90 are positioned laterally intermediate each bearing assembly 72 on each of center tunnel panels 106*a*, 106*b*.

Figure 12:
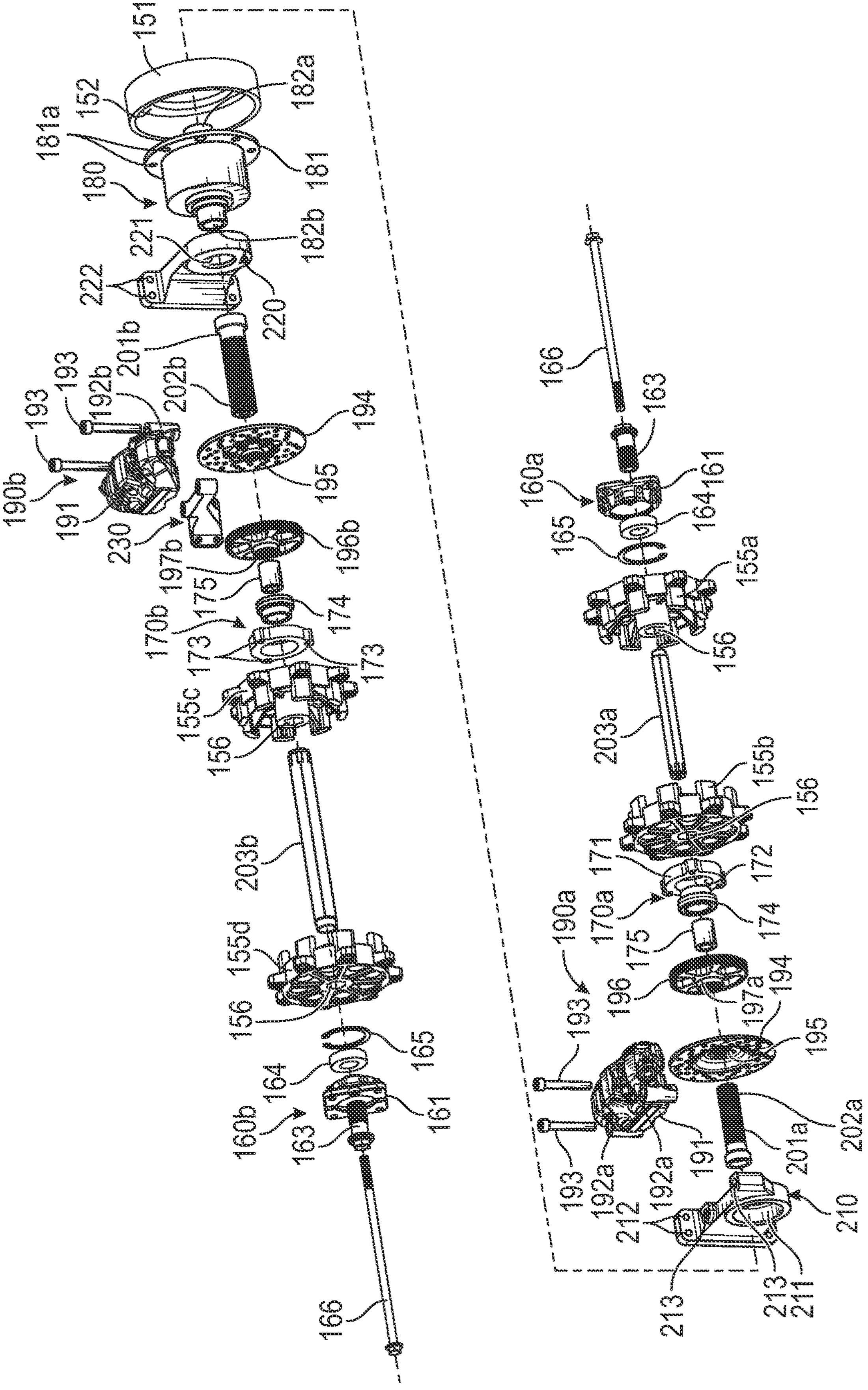
FIG. 12 is an exploded view of the drive axle assembly of FIG. 11.
Figure 13:
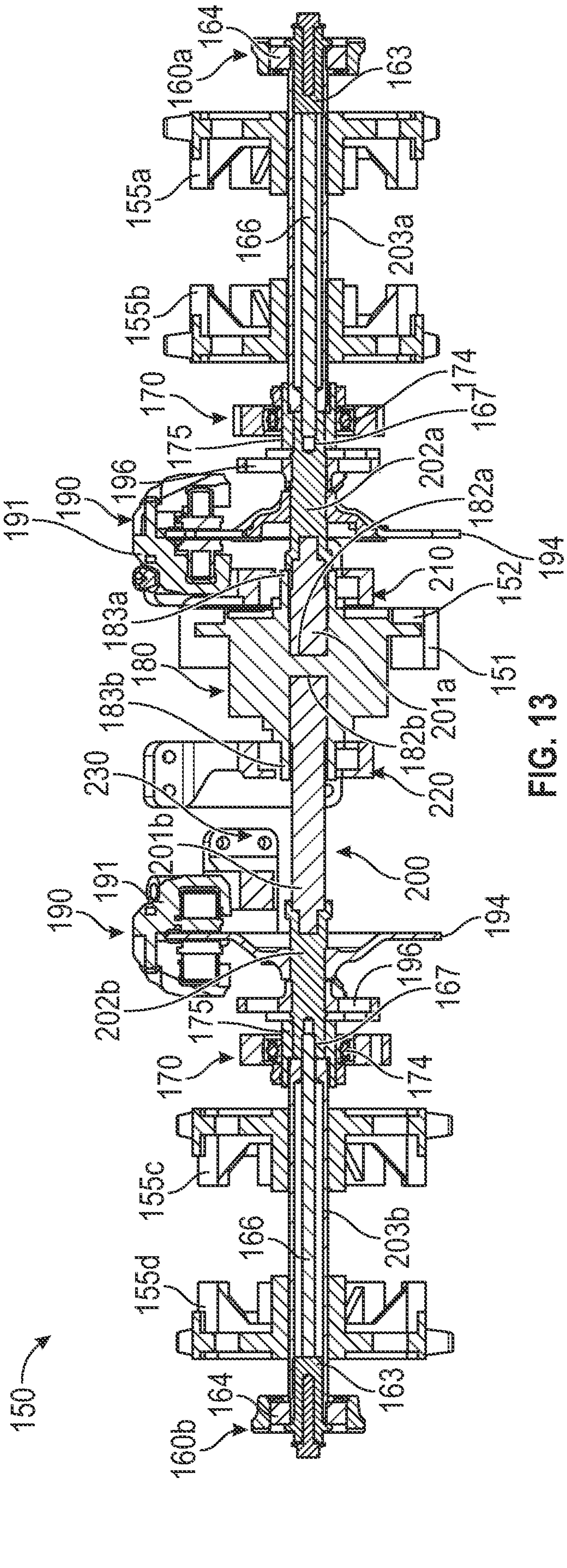
FIG. 13 is a cross-section, elevation view of the drive axle assembly of FIG. 11, taken along line 13-13 of FIG. 11.

Now referring to FIGS. 12-13, powertrain 48 includes a differential 180 operably coupled to drive axle assembly 150. Differential 180 includes a flange 181 with a plurality of mounting apertures 181*a* (FIG. 12). Differential 180 includes a pair of oppositely disposed outputs 182 including a first output 182*a* and a second output 182*b*. Illustratively, first output 182*a* faces towards the left of vehicle 2 and second output 182*b* faces towards the right of vehicle 2. Outputs 182*a*, 182*b* are nominally perpendicular to vehicle centerline 75. Further, a first collar 183*a* extends outward from differential 180 around first output 182*a* and a second collar 183*b* extends outward from differential 180 around second output 182*b*. Illustratively, outputs 182*a*, 182*b* are positioned on drive axle axis 85. Drive axle 150 includes a driven sprocket 151 coupled to differential 180. Driven sprocket 151 includes an inner flange 152 with apertures (not shown) configured to rotatably fix to flange 181. A plurality of fasteners (not shown) are configured to extend through apertures of inner flange (not shown) and apertures 181*a* to couple driven sprocket 151 to differential 180. A drive belt 92 extends around drive sprocket 90 and driven sprocket 151 and transfers rotational power between drive sprocket 90 and driven sprocket 151. In the present embodiment, differential 180 allows first output 182*a* and second output 182*b* to rotate at different output speeds. That is, differential 180 provides torque to each of first output 182*a* and second output 182*b*, however, to accommodate the power provided to both tracks, each track 32R, 32L may rotate at different speeds via outputs 182*a*, 182*b*, respectively. This allows track 32R to rotate at a higher or lower speed than track 32L in a scenario where track 32R must rotate a greater or lesser amount than track 32L (e.g. turning or wheel slippage). In the present embodiment, differential 180 operates similar to an open differential. In various embodiments, differential 180 may be a mechanical or electronic locking differential or a limited slip differential. Drive axle 150 includes an axle assembly 200 including differential 180, a first inner axle member 201*a*, a first middle axle member 202*a*, a first outer axle member 203*a*, a second inner axle member 201*b*, a second middle axle member 202*b*, and a second outer axle member 203*b*. Illustratively, first inner axle member 201*a* is coupled at its inner end to output 182*a* and second inner axle member 201*b* is coupled at its inner end to output 182*b*. In the present embodiment, first inner axle member 201*a* and first middle axle member 202*a* are a unitary piece, and second inner axle member 201*b* and second middle axle member 202*b* are a unitary piece. In the present embodiment, first middle axle member 202*a* and second middle axle member 202*b* comprise a splined surface. In various embodiments, each of first inner axle member 201*a*, second inner axle member 201*b*, first middle axle member 202*a*, second middle axle member 202*b* includes an outer splined surface. First outer axle member 203*a* and second outer axle member 203*b* may be hollow shafts, and in the present embodiment, first outer axle member 203*a* and second outer axle member 203*b* are identical or substantially similar. Each of first middle axle member 202*a* and second middle axle member 202*b* comprises a threaded insert 167 at its outer end such that threaded insert 167 abuts outer axle members 203*a*, 203*b* when in an installed configuration.

Referring to FIGS. 9-13, drive axle assembly 150 includes a pair of bearing assemblies 160, shown as a right bearing assembly 160*a* positioned at a right end of drive axle 200 and a left bearing assembly 160*b* positioned at a left end of drive axle 200. Bearing assemblies 160*a*, 160*b* are respectively fixed to side panels 180*a*, 180*b* precisely at openings 109*a*, 109*b* to establish a high degree of perpendicularity between drive axis 85 and vehicle centerline 75.

Each bearing assembly 160 includes a bearing support 161, sometimes referred to as a pillow block, including a plurality of apertures 162. Bearing support 161 supports a bearing 164 and a retainer clip 165 configured to retain bearing 164 within bearing support 161. Each bearing assembly 160 includes a collar configured to extend through bearing support 161 and bearing 164. Right bearing assembly 160*a* is configured to couple to outer side panel 108*a* about drive axle axis 85. Apertures 162 align with a plurality of apertures 109*c* in outer side panel 108*a* such that right bearing assembly 160*a* cooperates with opening 109*a* when in an installed configuration. A plurality of fasteners (not shown) extend through apertures 162 and 109*c* to couple right bearing assembly 160*a* to outer side panel 108*a*. Left bearing assembly 160*b* is configured to couple to outer side panel 108*b* about drive axle axis 85. Apertures 162 align with a plurality of apertures 109*c* in outer side panel 108*b* such that left bearing assembly 160*b* cooperates with opening 109*b* when in an installed configuration. A plurality of fasteners (not shown) extend through apertures 162 and 109*c* to couple left bearing assembly 160*b* to outer side panel 108*b*.

Outer axle members 203*a*, 203*b* are removable from the larger drive axle assembly 150, which facilitates access and service tasks as described below. A pair of fasteners are configured to rotatably fix outer axle members 203*a*, 203*b* to middle axle members 202*a*, 202*b*, respectively. A fastener 166 extends through bearing assemblies 160*a*, 160*b*, through outer axle members 203*a*, 203*b*, and engages threaded insert 167. Illustratively, a first fastener 166 extends through collar 163 of right bearing assembly 160, through first outer axle member 203*a*, and engages threaded insert 167 of first middle axle member 202*a*. Further, a second fastener 166 extends through collar 163 of left bearing assembly 160*b*, through second outer axle member 203*b*, and engages threaded insert 167 of second middle axle member 202*b*. That is, fastener 166 couples first outer axle member 203*a* to first inner axle member 201*a* and first middle axle member 202*a*. First inner axle member 201*a* is coupled to differential 180 at output 182*a*. Another fastener 166 couples second outer axle member 203*b* to second inner axle member 201*b* and second middle axle member 202*b*. Second inner axle member 201*b* is coupled to differential 180 at output 182*b*. Therefore, a continuous connection is made between outer side panel 108*a* and outer side panel 108*b* by a plurality of drive axle members.

Drive axle 150 also includes a second pair of bearing assemblies 170 shown as a first bearing assembly 170*a* and a second bearing assembly 170*b*. Bearing assemblies 170*a*, 170*b* are respectively fixed to center tunnel panels 106*a*, 106*b* precisely at openings 107*a*, 107*b* to further promote and facilitate the high degree of perpendicularity between drive axis 85 and vehicle centerline 75 mentioned.

Bearing assemblies 170 each include a bearing body or pillow block 171 which includes a plurality of apertures 173. Bearing body 171 also includes a bearing support bore 172 configured to receive a bearing 174. Bearing assembly 170*a* is positioned on axle assembly 200 at a position to the right of differential 180. Illustratively, bearing assembly 170*a* is coupled to an outer side of center tunnel panel 106*a* and bearing assembly 170*b* is coupled to an outer side of center tunnel panel 106*b*. Each of center tunnel panels 106*a*, 106*b* includes a plurality of apertures 105*c* surrounding opening 105. When bearing assemblies 170 are in an installed configuration, apertures 173 align with apertures 105*c* in outer side of center tunnel panels 106*a*, 106*b* and a fastener is inserted through apertures 173 and apertures 105*c* to install bearing assemblies 170*a*, 170*b* to the outer sides of center tunnel panels 106*a*, 106*b*, respectively. Bearing assemblies 170*a*, 170*b* are aligned with drive axle axis 85 and first opening 105*a*, first opening 105*b*.

Second bearing assemblies 170 include a sleeve 175 positioned radially intermediate the bearing 174 and axle assembly 200. Sleeve 175 extends laterally over a portion of first outer axle member 203*a* and a portion of first middle axle member 202*a*, and another sleeve 175 extends laterally over a portion of second outer axle member 203*b* and a portion of second middle axle member 202*b*. In the illustrative embodiment of FIG. 13, sleeve 175 may have an inconsistent inner diameter along its length to account for different diameters in outer axle member 203 and middle axle member 202. Sleeve 175 has a consistent outer diameter along its length so that it can be properly received by bearing 174.

Referring to FIGS. 10-13, a pillow block 210 and a pillow block 220 are provided on either side of differential 180. Pillow block 210 has a receiving surface 211 and pillow block 220 has a receiving surface 221. Illustratively, pillow block 210 supports collar 183*a* on receiving surface 211 and pillow block 220 supports collar 183*b* on receiving surface 221. That is, differential 180 is supported by, and may rotate within, pillow blocks 210, 220. In the present embodiment, each receiving surface 211, 221 may be a low-friction surface. Surface 211, 221 may be manufactured with a low-friction surface treatment, may be externally lubricated, or otherwise be made to have a generally low coefficient of friction. In various embodiments, receiving surface 211, 221 may be an inner ring of a bearing supported by the pillow block 210, 220. Pillow block 210 also has a plurality of apertures 212 and a plurality of fasteners (not shown) are configured to extend through apertures 212 and couple pillow block 210 to seventh brace 120*g*. Pillow block 220 also has a plurality of apertures 222 and a plurality of fasteners (not shown) are configured to extend through apertures 222 and couple pillow block 220 to seventh brace 120*g*. Pillow block 210 further includes a pair of vertically disposed bores 213.

A pillow block 230 is provided laterally intermediate pillow block 220 and center tunnel panel 106*b*. Pillow block 230 includes a plurality of apertures 232 and a plurality of fasteners are configured to extend through apertures 232 and couple pillow block 230 to seventh brace 120*g*. Pillow block 230 includes a pair of vertically disposed bores 233.

Vehicle 2 also includes a braking system including a pair of brake assemblies 190, shown as a first brake assembly 190*a* and a second brake assembly 190*b*. First brake assembly 190*a* is positioned on the right side of differential 180 and is positioned generally on one or both of first inner axle member 201*a* and first middle axle member 202*a*. A second brake assembly 190*b* is positioned on the left side of differential 180 and is positioned generally on one or both of second inner axle member 201*b* and second middle axle member 202*b*. Each brake assembly 190 comprises a brake caliper 191 and a brake disc 194. Brake caliper 191*a* comprises a pair of apertures 192*a* configured to align with apertures 213 when in an installed configuration. A fastener 193 extends through apertures 192*a* and apertures 213 to couple caliper 191*a* to pillow block 210. Further, brake caliper 191*b* comprises a pair of apertures 192*b* configured to align with apertures 233 when in an installed configuration. A fastener 193 extends through apertures 192*b* and apertures 233 to couple caliper 191*b* to pillow block 230. In the present embodiment, pillow block 210 supports both differential 180 and first caliper 191*a*.

Still referring to FIGS. 10-13, brake assemblies 190 each include a brake disc 194. A first brake disc 194 is positioned along axle assembly 200 to interface with brake caliper 191 of the right side brake assembly 190*a*. A second brake disc 194 is positioned along axle assembly 200 to interface with brake caliper 191 on the left side brake assembly 190*b*. Each brake disc 194 has a mounting bore 195 with splines configured to complement the splined surface of axle assembly 200. That is, brake disc 194*a* has a mounting bore 195*a* with splines that are complementary to the splines on axle assembly 200. More particularly, brake disc 194 is configured to move laterally, sometimes referred to as floating, along one or both of first inner axle member 201*a* and first middle axle member 202*a*, while still being rotatably coupled therewith. Similarly, the second brake disc 194 is configured to move laterally or float along one or both of second inner axle member 201*b* and second middle axle member 202*b*, while still being rotatably coupled. In the present embodiment, each brake disc 194 is a floating brake disc and may float, or slide, along splined portions of axle assembly 200 within a predefined tolerance. Each brake disc 194 and caliper 191 is positioned on either side of differential 180 so that individual braking control can be maintained over both tracks 32L, 32R.

Powertrain 48 also includes a pair of toner rings 196. A first toner ring 196 is positioned along axle assembly 200 to the right of differential 180. Illustratively, this right-side toner ring 196 is positioned intermediate the right-side brake disc 194 and bearing assembly 170*a*. A second, left-side toner ring 196 is positioned along axle assembly 200 to the left of differential 180. Illustratively, the left-side toner ring 196 is positioned intermediate the left-side brake disc 194 and bearing assembly 170*b*. In the present embodiment, toner rings 196 are positioned adjacent center tunnel panels 106*a*, 106*b*, respectively. Toner rings 196 also comprise an inner splined bore 197 configured to rotatably fix toner rings 196 to axle assembly 200. Toner rings 196 are accompanied by a visual sensor (not shown) configured to measure a rotational speed of axle assembly 200 on either side of differential 180. The visual sensor may be supported by any suitable proximate non-rotating structure, such as by center tunnel panel 106 or by center cover 102.

Drive axle 150 also comprises a plurality of drive cogs 155*a*, 155*b*, 155*c*, 155*d* positioned and configured to transfer driving torque from drive axle 150 to tracks 32R and 32L. Illustratively, a first drive cog 155*a* and a second drive cog 155*b* are positioned to the right of differential 180 along axle assembly 200. A third drive cog 155*c* and a fourth drive cog 155*d* are positioned to the left of differential 180 along axle assembly 200. Illustratively, drive cogs 155*a* and 155*b* are positioned between an inner side of outer side panel 108*a* and an outer side of center tunnel panel 106*a*. Further, drive cogs 155*c* and 155*d* are positioned between an inner side of outer side panel 108*b* and an outer side of center tunnel panel 106*b*. Each pair of drive cogs 155*a*, 155*b*, and 155*c*, 155*d* are spaced an equal distance from each other, and each pair of drive cogs 155*a*, 155*b*, and 155*c*, 155*d* are configured to engage and provide rotational power to tracks 32R, 32L, respectively. Further, one pair of drive cogs 155*a*, 155*b* is configured to engage the track 32R of right rear suspension 30R and the other pair of drive cogs 155*c*, 155*d* is configured to engage the track 32L of the left rear suspension 30L. In the present embodiment, each of drive cogs 155*a*, 155*b*, 155*c*, 155*d* includes a mounting bore 156 with a hexagonal cross-section, and outer axle members 203*a*, 203*b* have a commensurately sized hexagonal cross-section on their outer surface. That is, drive cogs 155*a*, 155*b* are rotatably coupled to outer axle member 203*a* and drive cogs 155*c*, 155*d* are rotatably coupled to outer axle member 203*b*.

Figure 14:
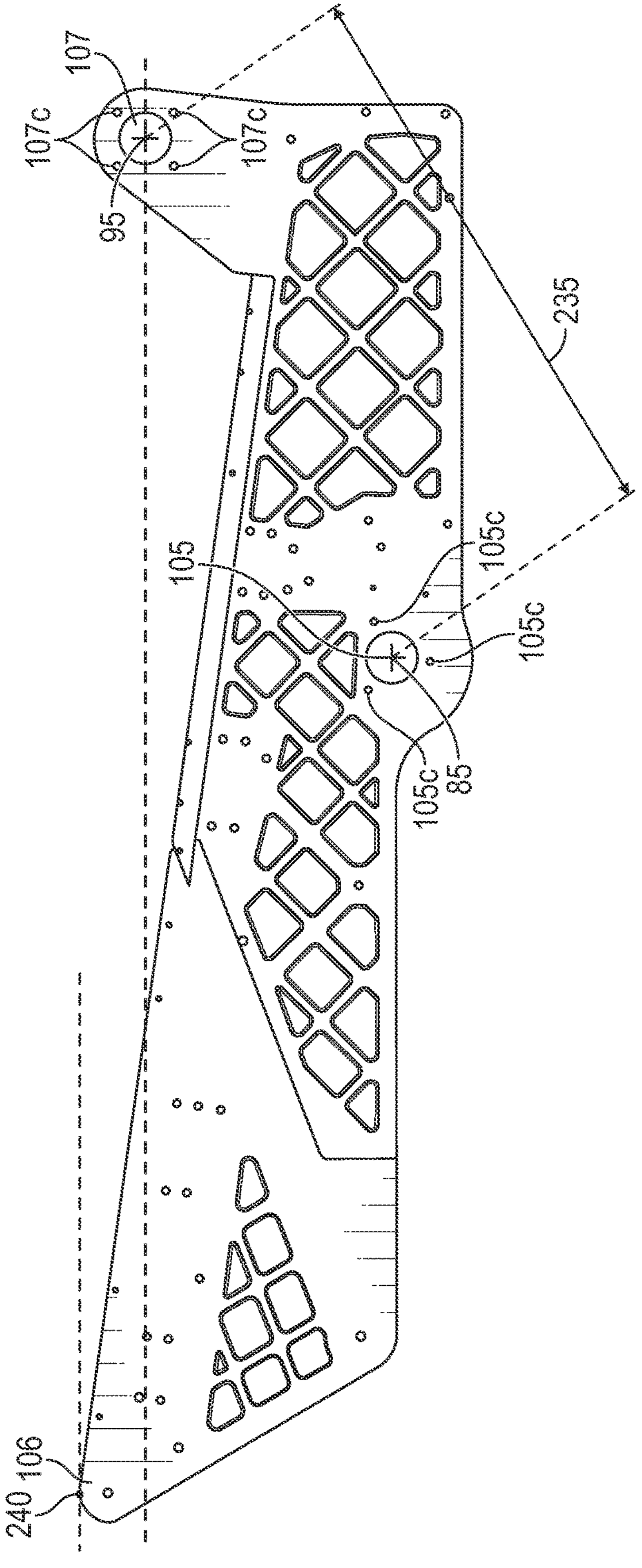
FIG. 14 is a side elevation view of a tunnel panel of the frame of the vehicle of FIG. 1.

Now referring to FIG. 14, center tunnel panels 106 will be explained in greater detail. In the illustrative embodiment of FIG. 4, both center tunnel panels 106*a*, 106*b* are identical components, though it is contemplated that variations may be made as required or desired for a particular application. Center tunnel panels 106 each include opening 105 and opening 107. Opening 105 is positioned for the drive axle

150 to extend through openings 105, and drive axle axis 85 is positioned on the center of opening 105, as described above. Further, opening 107 is positioned for the jackshaft 70 to extend through openings 107, and jackshaft axis 95 is positioned on the center of opening 107, as also described above. Belt 92 extends around drive sprocket 90 and driven sprocket 151 which are positioned along jackshaft 70 and drive axle 150, respectively. Center tunnel panel 106 may be a single unitary and monolithic piece of material, such that, a distance 235 between drive axle axis 85 and jackshaft axis 95 is precisely determined within any one center tunnel panel 106, and is accurately reproduced across multiple (e.g., a pair) of center tunnel panels 106*a*, 106*b*. This accuracy and precision of distance 235 facilitates the use of belt 92 with a specified tension. Moreover, because belt 92 spans only two mounting points across a pair of identical frame pieces, proper tensioning and tolerances facilitate the use of belt 92 without an external tensioner and with a high degree of repeatability in nominal tension for belt 92 of a predetermined circumference.

Center tunnel panel 106 has a rearward high point 240 which is positioned vertically higher than jackshaft axis 95.

4. Cooling System

Figure 16:
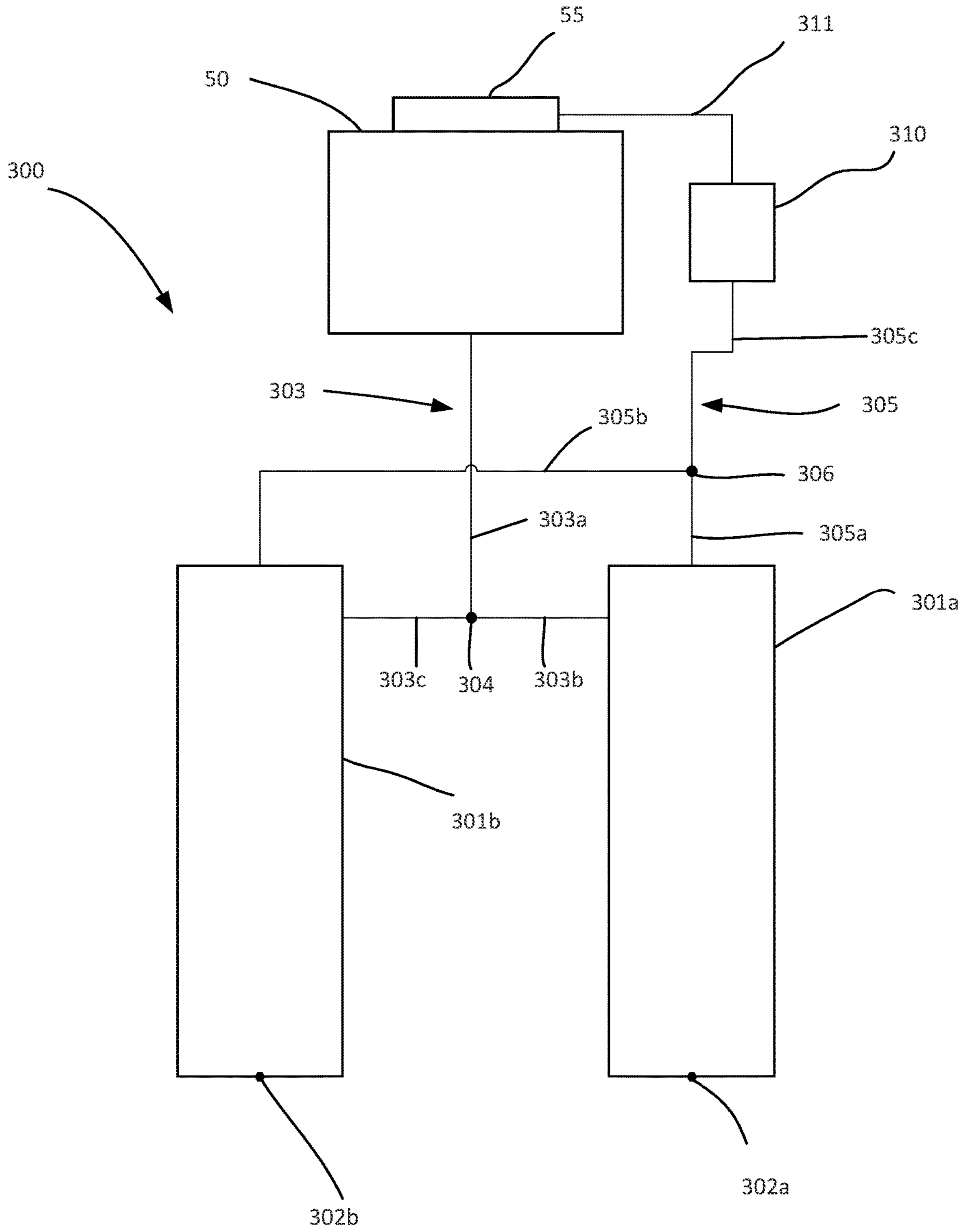
FIG. 16 is a diagrammatic view of the cooling assembly of the vehicle of FIG. 1.

Now referring to FIGS. 15-16, a cooling assembly 300 includes a first cooler 301*a* and a second cooler 301*b*. Illustratively, first cooler 301*a* is positioned within first side tunnel 42 and second cooler 301*b* is positioned within second side tunnel 44. First cooler 301*a* is positioned vertically below side cover 104*a* and second cooler 301*b* is positioned vertically below side cover 104*b*, and may be mounted directly to an undersurface of the adjacent side cover 104*a* or 104*b*. Illustratively, first cooler 301*a* is positioned vertically above suspension 30R and track 32R, and second cooler 301*b* is positioned vertically above suspension 30L and track 32L. Each of coolers 301*a*, 301*b* includes a heat exchanger, and includes a conduit or a plurality of conduits for a fluid to pass into and out of the heat exchanger. In the present embodiment, a coolant such as antifreeze, water, a mixture of antifreeze and water, or other liquid may be to circulate coolant through the heat exchanger.

Cooling assembly 300 also includes a pump 55 operably coupled to prime mover as shown schematically in FIG. 16. In the present embodiment, pump 55 is integral or directly coupled to prime mover 50. In various embodiments, pump 55 may be remotely located from prime mover 50. In yet another embodiment, pump 55 may be remotely located and independently powered. In yet another embodiment, pump 55 may be operated by an electric motor.

Referring still to FIG. 16, cooling assembly 300 also includes a first conduit assembly 303, a second conduit assembly 305, a fluid reservoir 310, and a third conduit 311. Illustratively, first conduit assembly 303 includes a conduit 303*a*, a conduit 303*b*, a conduit 303*c*, and a junction 304. Conduit 303*a* is fluidly coupled between prime mover 50 and junction 304. Further, conduit 303*b* is fluidly coupled between junction 304 and cooler 301*a*, and conduit 303*c* is fluidly coupled between junction 304 and cooler 301*b*. Second conduit assembly 305 includes a conduit 305*a*, a conduit 305*b*, a conduit 305*c*, and a junction 306. Illustratively, conduit 305*a* is fluidly coupled between cooler 301*a* and junction 306 and conduit 305*b* is fluidly coupled between cooler 301*b* and junction 306. Conduit 305*c* is fluidly coupled between junction 306 and fluid reservoir 310. Conduit 311 is fluidly coupled between reservoir 310 and pump 55.

In the present embodiment, cooling fluid is pushed through the cooling assembly 300 by pump 55. Cooling fluid is circulated through prime mover 50 to keep it cool and operating within a predetermined range of operable temperatures. Once cooling fluid has left prime mover 50, cooling fluid has retained some thermal energy from prime mover 50 and increased in temperature. Cooling fluid passes through conduit 303*a* and reaches junction 304. In the present embodiment, junction 304 is a T-junction and allows the cooling fluid to simultaneously flow through conduit 303*b* to cooler 301*a* as well as through conduit 303*c* to cooler 301*b*. That is, a single output on prime mover 50 provides cooling fluid to both cooler 301*a* and cooler 301*b* in parallel. Coolers 301*a*, 301*b* comprise a plurality of conduits wherein the cooling fluid can flow and reduce its temperature before moving through cooling assembly 300.

As tracks 32R, 32L rotate they throw snow and/or ice upward onto the lower surface of coolers 301*a*, 301*b*. The snow/ice provides a cooling effect to the cooling fluid as it flows through coolers 301*a*, 301*b* and absorbs some of the cooling fluid's thermal energy to reduce its temperature. Cooling fluid then leaves cooler 301*a* through conduit 305*a* to reach junction 306 and cooling fluid leaves cooler 301*b* through conduit 305*b* to reach junction 306. Cooling fluid from both coolers 301*a*, 301*b* joins at junction 306 and moves on to reservoir 310 where cooling fluid can be stored. Reservoir 310 is fluidly coupled to pump 55 by conduit 311 to make a complete circuit for the cooling fluid to pass through.

Cooling assembly 300 also includes a bleed valve 302*a* and a bleed valve 302*b*. Illustratively, bleed valve 302*a* is positioned at a rearward end or end portion of cooler 301*a* and bleed valve 302*b* is positioned at a rearward end or end portion of cooler 301*b*. Bleed valves 302*a*, 302*b* may be a small screw configured to allow air out of the cooling system to reduce air pockets and remove foreign matter. In the present embodiment, bleed valves 302*a*, 302*b* are located at a highest position of cooling assembly. Further, bleed valves 302*a*, 302*b* are positioned at an identical, or substantially similar, vertical height.

In the present embodiment, coolers 301*a*, 301*b* follow the same profile as side covers 104*a*, 104*b*. Side covers 104*a*, 104*b* extend generally upward from their front ends to their rear ends, and as such, bleed valves 302*a*, 302*b* are positioned at a vertical height higher than a front end of coolers 301*a*, 301*b*.

Cooling assembly 300 is constructed so that coolers 301*a*, 301*b* are in a parallel path with each other. A parallel path creates an exemplary cooling effect, and doesn't improperly load one of coolers 301*a*, 301*b* with a higher cooling load if cooling fluid flowed first through one cooler and then into the second cooler.

In various embodiments, coolers 301*a*, 301*b* are frame members configured to support tunnel assembly 100. In various embodiments, side cover 104*a* is an upper wall of cooler 301*a* and side cover 104*b* is an upper wall of cooler 301*b*. That is, coolers 301*a*, 301*b* are structural members between center tunnel panels 106 and outer side panels 108, and coolers 301*a*, 301*b* are integral members of first side tunnel 42 and second side tunnel 44.

5. Fuel Tank

Referring to FIG. 15, vehicle 2 includes fuel tank 250. Fuel tank 250 is fluidly coupled to prime mover 50. Fuel tank 250 is positioned within tunnel assembly 100. More particularly, fuel tank 250 is positioned within center tunnel 40. Fuel tank 250 is positioned vertically below first brace 120*a*, and between right center tunnel panel 106*a* and left center tunnel panel 106*b*. Fuel tank 250 is positioned laterally intermediate track 32R and track 32L. In the present embodiment, fuel tank 250 is positioned longitudinally rearward of drive axle 150, and longitudinally rearward of a front end of right center tunnel panel 106*a* and left center tunnel panel 106*b*. Further, fuel tank 250 is positioned longitudinally rearward of footrest area 111 and longitudinally rearward of the forwardmost portion of tracks 32R and 32L. In the present embodiment, at least a portion of fuel tank 250 is vertically aligned with tracks 32R, 32L. Further, at least a portion of fuel tank 250 is vertically aligned with drive axle assembly 150. In the present embodiment, fuel tank 250 is vertically below seat 4 and aligned in a vertical direction with at least one of track 32R or 32L.

In the present embodiment, fuel tank 250 is coupled to frame 10 at brace assembly 120. In the present embodiment, a plurality of fasteners (not shown) extend through a plurality of apertures (not shown) in first brace 120*a* and couple to fuel tank 250. That is, fuel tank 250 is suspended from brace assembly 120. In various embodiment, an additional support structure may be provided at a lower extent of fuel tank 250.

The placement of fuel tank 250 in center tunnel 40 positions tank 250 at a low and centered position which promotes a low overall center of gravity for vehicle 2, and contributes to favorable handling characteristics.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

The invention claimed is:

1. A snowmobile, comprising:
- a frame including a tunnel assembly;
- a plurality of ground engaging members supporting the frame, the plurality of ground engaging members including a first ski and a first track;
- a powertrain supported by the frame, the powertrain configured to provide rotational power to the first track;
- the tunnel assembly comprising:
  - a first tunnel portion comprising a pair of laterally-spaced longitudinally-extending panels including a first longitudinally extending panel and a second longitudinally extending panel;
  - a second tunnel portion positioned on one lateral side of the first tunnel portion, the second tunnel portion comprising a first outer side panel laterally spaced outwardly from the first longitudinally extending panel of the first tunnel portion;
  - a third tunnel portion positioned on the other lateral side of the first tunnel portion, the third tunnel portion comprising a second outer side panel laterally spaced outwardly from the second longitudinally extending panel of the first tunnel portion; and
  - a brace assembly comprising:
- a first brace positioned within the first tunnel portion, the first brace extending between the first longitudinally extending panel and the second longitudinally extending panel;
- a second brace positioned within the second tunnel portion, the second brace extending between the first outer side panel and the first longitudinally extending panel;
- a third brace positioned within the third tunnel portion, the third brace extending between the second outer side panel and the second longitudinally extending panel;
- the first brace is coupled to the second brace at a first coupling point and the first brace is coupled to the third brace at a second coupling point;
- a fourth brace positioned longitudinally forward of the second brace, the fourth brace extending between the first outer side panel and the first longitudinally extending panel; and
- a fifth brace positioned longitudinally forward of the third brace, the fifth brace extending between the second outer side panel and the second longitudinally extending panel, wherein the first brace, the second brace, the third brace, the fourth brace, and the fifth brace are in the general shape of an "X" when viewed from a top perspective.

2. The vehicle of claim 1, further comprising a fuel assembly operably coupled to the powertrain, the fuel assembly including a fuel tank, wherein the fuel tank is positioned between the pair of laterally-spaced longitudinally-extending panels and vertically below the first brace.

3. The vehicle of claim 1, further comprising a second track, wherein the second brace is positioned vertically above the first track and the third brace is positioned vertically above the second track.

4. The vehicle of claim 1, wherein a portion of the powertrain is supported by the first brace.

5. The vehicle of claim 1, wherein the first outer side panel forms a first outer lateral side surface of the tunnel assembly, and the second outer side panel forms a second outer lateral side surface of the tunnel assembly opposite the first outer lateral side surface.

6. A snowmobile, comprising:
- a frame including a tunnel assembly;
- a plurality of ground engaging members supporting the frame, the plurality of ground engaging members including a first ski and a first track;
- a powertrain supported by the frame, the powertrain configured to provide rotational power to the first track;
- the tunnel assembly comprising:
  - a first tunnel portion comprising a pair of laterally-spaced longitudinally-extending panels including a first longitudinally extending panel and a second longitudinally extending panel;
  - a second tunnel portion positioned on one lateral side of the first tunnel portion, the second tunnel portion comprising a first outer side panel laterally spaced outwardly from the first longitudinally extending panel of the first tunnel portion;
  - a third tunnel portion positioned on the other lateral side of the first tunnel portion, the third tunnel portion comprising a second outer side panel laterally spaced outwardly from the second longitudinally extending panel of the first tunnel portion; and
  - a brace assembly comprising:
- a first brace positioned within the first tunnel portion, the first brace extending between the first longitudinally extending panel and the second longitudinally extending panel;
- a second brace positioned within the second tunnel portion, the second brace extending between the first outer side panel and the first longitudinally extending panel;
- a third brace positioned within the third tunnel portion, the third brace extending between the second outer side panel and the second longitudinally extending panel; and the first brace is coupled to the second brace at a first coupling point and the first brace is coupled to the third brace at a second coupling point, wherein the tunnel assembly further comprises a floor pan coupled to the first longitudinally extending panel, the second longitudinally extending panel, the first outer side panel, and the second outer side panel.

7. The vehicle of claim 6, further comprising:

a fourth brace positioned longitudinally forward of the second brace, the fourth brace extending between the first outer side panel and the first longitudinally extending panel; and a fifth brace positioned longitudinally forward of the third brace, the fifth brace extending between the second outer side panel and the second longitudinally extending panel.

* * * * *